(12) United States Patent
Guarraci et al.

(10) Patent No.: US 11,146,513 B1
(45) Date of Patent: *Oct. 12, 2021

(54) GENERATING MESSAGES HAVING IN-MESSAGE APPLICATIONS

(71) Applicant: Twitter, Inc., San Francisco, CA (US)

(72) Inventors: Brian Guarraci, San Francisco, CA (US); William Morgan, San Francisco, CA (US); Jeremy Gordon, San Francisco, CA (US); Grant Monroe, San Francisco, CA (US); Buster Benson, San Francisco, CA (US); Russell D'sa, San Francisco, CA (US); Adam Singer, San Francisco, CA (US); Ian Chan, San Francisco, CA (US); Brian Ellin, San Francisco, CA (US); Reeve Thompson, San Francisco, CA (US); Luke Alonso, San Francisco, CA (US); Zachary Taylor, San Francisco, CA (US); Zhigang Chen, San Francisco, CA (US)

(73) Assignee: Twitter, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/581,625

(22) Filed: Sep. 24, 2019

Related U.S. Application Data

(63) Continuation of application No. 15/889,090, filed on Feb. 5, 2018, now Pat. No. 10,439,965, which is a
(Continued)

(51) Int. Cl.
*G06F 15/16* (2006.01)
*H04L 12/58* (2006.01)
(Continued)

(52) U.S. Cl.
CPC ........ *H04L 51/046* (2013.01); *G06F 3/04842* (2013.01); *H04L 51/18* (2013.01);
(Continued)

(58) Field of Classification Search
CPC ... H04L 51/046; H04L 51/18; H04L 67/2823; H04L 29/08756; H04L 51/32;
(Continued)

(56) References Cited

U.S. PATENT DOCUMENTS 7,865,394 B1   1/2011   Calloway et al.
9,887,941 B1   2/2018   Guarraci
(Continued)

*Primary Examiner* — Johnny B Aguiar
(74) *Attorney, Agent, or Firm* — Fish & Richardson P.C.

(57) ABSTRACT

Various embodiments disclose an in-message application facilitating the use of third-party application programming interfaces (APIs). In particular, these in-message applications (referred to as "cards") may be designed by a developer to access third-party API functionality. A user may then create a message referencing, e.g., a web address associated with the developer's card. The system may receive the user's message and recognize the reference. The system may then distribute an instantiation of the card to various recipients, the instantiation including elements generated using, or providing the user access to, the third party functionality.

33 Claims, 31 Drawing Sheets

Related U.S. Application Data continuation of application No. 14/612,998, filed on Feb. 3, 2015, now Pat. No. 9,887,941, which is a continuation-in-part of application No. 13/744,977, filed on Jan. 18, 2013, now Pat. No. 9,813,260.

(51) Int. Cl.
*G06F 3/0484* (2013.01)
*H04L 29/08* (2006.01)
*G06F 40/106* (2020.01)
*G06F 40/186* (2020.01)

(52) U.S. Cl.
CPC .......... *G06F 40/106* (2020.01); *G06F 40/186* (2020.01); *H04L 29/08756* (2013.01); *H04L 51/04* (2013.01); *H04L 51/066* (2013.01); *H04L 51/32* (2013.01); *H04L 67/2823* (2013.01)

(58) Field of Classification Search
CPC ... H04L 51/066; H04L 51/04; G06F 3/04842; G06F 40/106; G06F 40/186
USPC .................. 709/204, 206, 207, 217, 219
See application file for complete search history.

(56) References Cited

U.S. PATENT DOCUMENTS

| | | |
|---|---|---|
| 2002/0013708 A1 | 1/2002 | Walker et al. |
| 2002/0073058 A1 | 6/2002 | Kremer |
| 2004/0019648 A1 | 1/2004 | Huynh et al. |
| 2004/0075669 A1 | 4/2004 | Bronstein |
| 2004/0205514 A1 | 10/2004 | Sommerer |
| 2005/0240596 A1 | 10/2005 | Worthen et al. |
| 2006/0075033 A1 | 4/2006 | Bienstock et al. |
| 2006/0088144 A1* | 4/2006 | Mitchell ........... H04M 1/72547 379/88.17 |
| 2006/0168064 A1 | 7/2006 | Huynh et al. |
| 2007/0244977 A1 | 10/2007 | Atkins |
| 2007/0271336 A1 | 11/2007 | Ramaswamy |
| 2008/0034040 A1 | 2/2008 | Wherry et al. |
| 2009/0079750 A1* | 3/2009 | Waxman ............... G06Q 10/107 345/581 |
| 2009/0113282 A1 | 4/2009 | Schultz |
| 2009/0144392 A1 | 6/2009 | Wang et al. |
| 2011/0004517 A1 | 1/2011 | Soto et al. |
| 2011/0145698 A1* | 6/2011 | Penov .................. G06F 40/221 715/235 |
| 2011/0153388 A1 | 6/2011 | Vuong |
| 2011/0176788 A1 | 7/2011 | Bliss et al. |
| 2011/0264751 A1 | 10/2011 | Jans |
| 2011/0265011 A1 | 10/2011 | Taylor |
| 2012/0072835 A1* | 3/2012 | Gross .................... G06Q 10/10 715/243 |
| 2012/0109754 A1 | 5/2012 | Mei et al. |
| 2012/0109836 A1 | 5/2012 | Chen |
| 2012/0117176 A1 | 5/2012 | Luo |
| 2012/0254321 A1 | 10/2012 | Lindsay et al. |
| 2012/0317218 A1 | 12/2012 | Anderson et al. |
| 2013/0117656 A1 | 5/2013 | Verlaan |
| 2013/0151936 A1 | 6/2013 | Hsu |
| 2013/0227012 A1* | 8/2013 | Ramdas ................ H04L 51/063 709/204 |
| 2013/0268829 A1 | 10/2013 | Lansford |
| 2013/0311902 A1* | 11/2013 | O'Shaugnessy ...... G06F 40/169 715/753 |
| 2014/0025724 A1 | 1/2014 | Granger et al. |
| 2014/0052794 A1 | 2/2014 | Tucker et al. |
| 2014/0074629 A1 | 3/2014 | Rathod |
| 2014/0082494 A1 | 3/2014 | Harari |
| 2014/0115432 A1 | 4/2014 | Turner |

\* cited by examiner

Police are Optimistic about Boy in Well
A small boy fell in a well today. Rescuers have been searching the area as a large crowd gather. The ...
by Sally Reporter @SallyReporter } Example 510

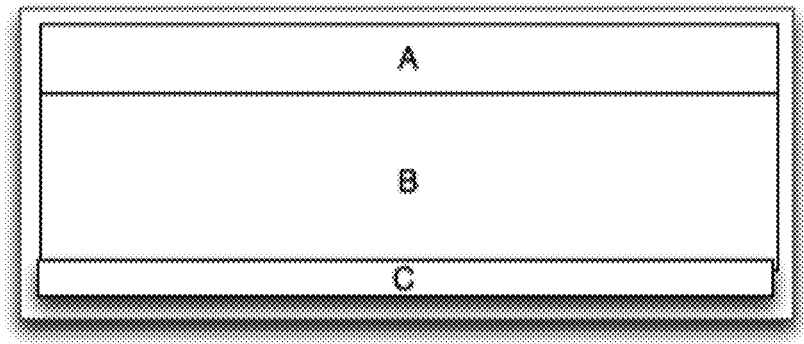

} Structure 511

A: Text (Bold Title, up to 2 lines)
B: Text (Description, clipped with ellipses)
C: Text (Byline)

*FIG. 5F*

Police are Optimistic about Boy in Well
A small boy fell in a well today. Rescuers have been searching the area as a large crowd gather. The boy was said to be looking for his...

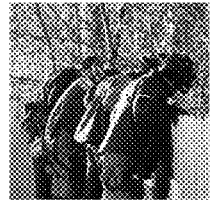

Sally Reporter @SallyReporter

} Example 512

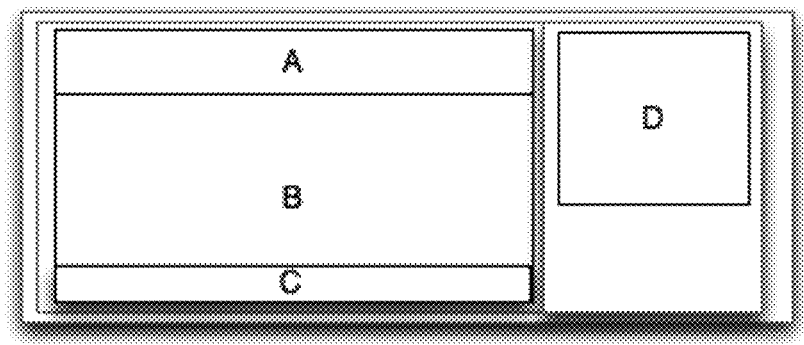

} Structure 513

A: Text (Bold Title, up to 2 lines)
B: Text (Description, clipped with ellipses)
C: Text (Byline)
D: Image

*FIG. 5G*

Adam Singer @S··gy
I am selling my Printer on @gety$rdsale.
$89. http://yd.sl/ek73S Blackwell Printer PR2336z
Monochrome Printer

*$89*

The PR2336z is a compact monochrome laser printer. Perfect for small office or home office use, it features fast printing at up to 24ppm, up to 2400 x 600 dip resolution for high-quality output...

[ Buy Now ]

Yardsale  @gety$rdsale  · Follow

| Property | Value |
|---|---|
| twitter:card | "summary", "photo", or "player" |
| twitter:site | @username of website |
| twitter:site:id | Same as twitter:user, but the user's Twitter ID |
| twitter:creator | @username of content creator |
| twitter:creator:id | Twitter user ID of content creator |
| twitter:url | Canonical URL of the card content |
| twitter:description | Description of content (maximum 200 characters) |
| twitter:title | Title of content (max 70 characters) |
| twitter:image | URL of image to use in the card |
| twitter:image:width | Width of image in pixels |
| twitter:image:height | Height of image in pixels |
| twitter:player | HTTPS URL of player iframe |
| twitter:player:width | Width of iframe in pixels |
| twitter:player:height | Height of iframe in pixels |
| twitter:player:stream | URL to raw video or audio stream |

*FIG. 7A*

```
<meta name="twitter:card" content="summary">
<meta name="twitter:site" content="@ep$eader">
<meta name="twitter:creator" content="@$allyReporter">
<meta name="twitter:url" content="http://epreaderpaperelpaso/byInWellstory.html">
<meta name="twitter:title" content= "Police are Optimistic about Boy in Well">
<meta name="twitter:description" content="Newark A small boy fell in a well today.
Rescuers have been searching the area as a large crowd gather. The boy was said to be looking
for his...">

<meta name="twitter:image" content="http://epreaderpaperelpaso/image.jpg">
```

*FIG. 7B*

Richard Henry  @SichardHenry    4m
That's a whole lot of people... epre.ms/yzc3Wg
Hide summary   Reply   Retweet   Favorite

Police are Optimistic about Boy in Well
By Sally Reporter  @$allyReporter

NEWARK – A small boy fell in a well today. Rescuers have been searching the area as a large crowd gather. The boy was said to be looking for his...

R The El Paso Reader  @ep$eader

8:03 PM Sep 27 via Twitter for Mac · View Tweet page

*FIG. 7C*

The El Paso Reader summary

Police are Optimistic about Boy in Well

By Sally Reporter

NEWARK – A small boy fell in a well today. Rescuers have been searching the area as a large crowd gather. The boy was said to be looking for his dog when he wandered ...

Sally Reporter
@SallyReporter

The El Paso Reader 
@ep$eader

GENERATING MESSAGES HAVING IN-MESSAGE APPLICATIONS

CROSS REFERENCE TO RELATED APPLICATIONS

This application is a continuation of U.S. application Ser. No. 15/889,090 filed Feb. 5, 2018, now allowed, which is a continuation of U.S. application Ser. No. 14/612,998 filed Feb. 3, 2015, now U.S. Pat. No. 9,887,941 issued Feb. 6, 2018 which is a continuation-in-part application of U.S. application Ser. No. 13/744,977, filed on Jan. 18, 2013, entitled "IN-MESSAGE APPLICATIONS IN A MESSAGING PLATFORM", now U.S. Pat. No. 9,813,260 issued Nov. 7, 2017, each of which is herein incorporated by reference in its entirety.

BACKGROUND

With the expansion of cellular, WIFI™, cable, fiber, and other Internet access points and the growing ubiquity of Internet-capable mobile devices, messaging systems have expanded their reach and influence in areas of social/professional networking, real-time collaboration, events, and general communication. Previously, bandwidth and hardware limitations made it difficult or even impossible to share large amounts of data in real time. Today's messaging systems include peer-to-peer and subscriber-based sharing of data and information seamlessly among a variety of different devices.

Unlike the limitations of early messaging systems such as Short Message Service (SMS), messaging systems are now capable of receiving and propagating video, audio, images, and uniform resource locators (URLs) of various different content among users. Providing access to this myriad of content in a consistent and meaningful way is non-trivial. The interests of users, the platform, and content providers must all be considered. A fragmented experience across devices, between users, and among content hosted between different providers can lead to a frustrating and difficult user experience.

Furthermore, the content of the SMS may be limited to displaying only static contents. However, messages that facilitate interactions among various parties may be useful.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIGS. 5A-5G are examples of components in accordance with one or more embodiments.

FIG. 7A is an example set of in-message application tags in accordance with one or more embodiments.

FIG. 7B is an example of web page metadata identifying an in-message application in accordance with one or more embodiments.

FIG. 7C is an example rendering of an in-message application by a web client, in accordance with one or more embodiments.

Figure 1:
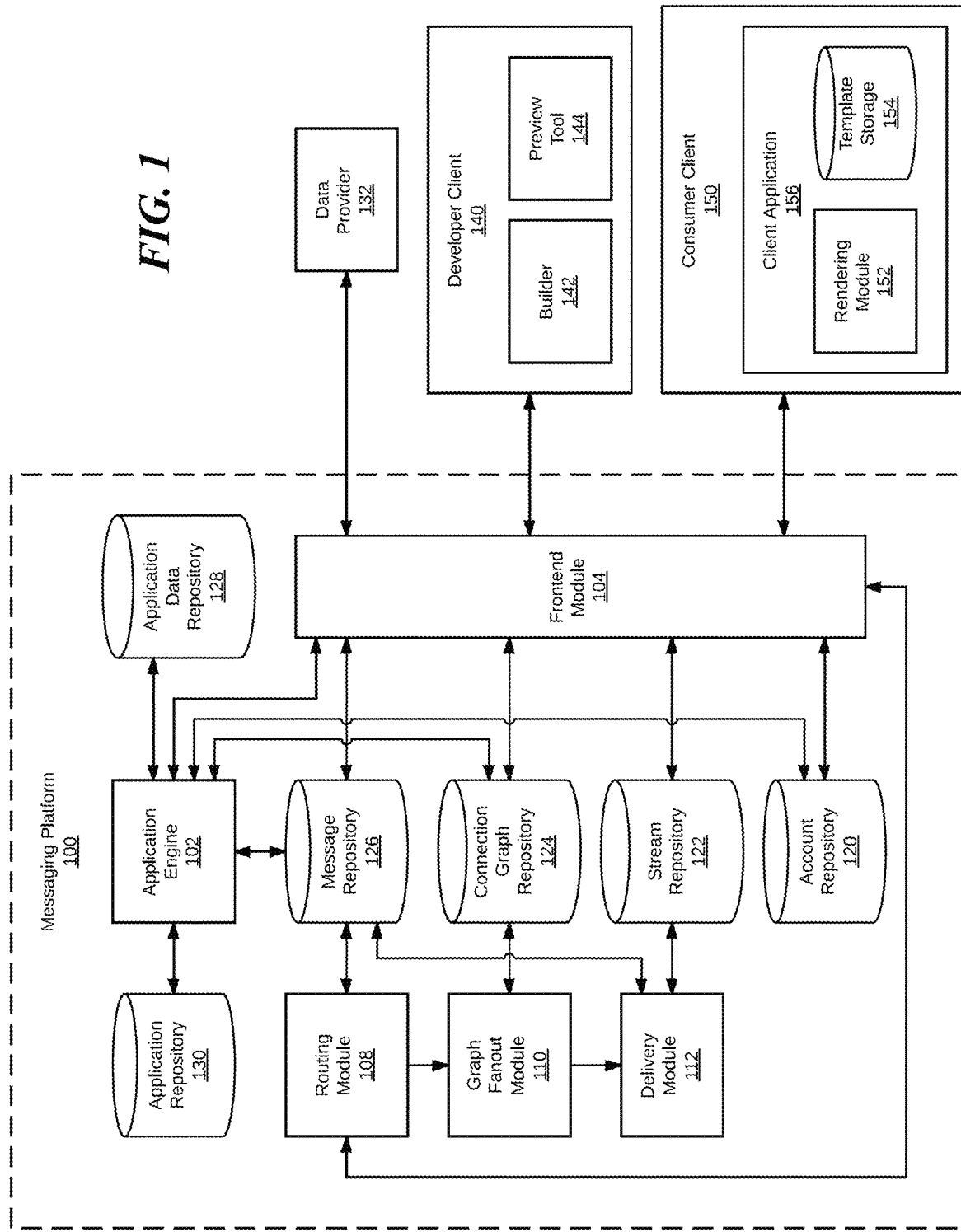
FIG. 1 is a schematic diagram of a system in accordance with one or more embodiments.

While the flow and sequence diagrams presented herein show an organization designed to make them more comprehensible by a human reader, those skilled in the art will appreciate that actual data structures used to store this information may differ from what is shown in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Some of the disclosed embodiments enable in-message applications. A broadcast message including a reference (e.g., a URL) to an external data provider is received from a client computing device. The reference is used to obtain an identifier of the in-message application. One or more components of the in-message application are identified. Data is downloaded from the external data provider and associated with at least one of the components. The broadcast message and the data are then served to a consumer client computing device. The consumer client renders the in-message application according to a predefined visual structure.

Various embodiments are directed to receiving and using in-message applications. These embodiments can receive a broadcast message from a client computing device, e.g., a "Tweet" message or other short message. The embodiments can then identify, in the broadcast message, a reference to an external data provider; obtaining an identifier of the in-message application from the external data provider; using, by a computer processor, the identifier to identify a set of components of the in-message application, where placement of the set of components is defined by a visual structure of the in-message application and where each of the set of components is a user interface (UI) element; associating data obtained from the external data provider with a component of the set of components; and serving the broadcast message and the data to a consumer client, where the consumer client renders the in-message application based on the visual structure.

Various embodiments relate to a system for using an in-message application. The system can include a computer processor; an application repository storing a visual structure of the in-message application, where the visual structure defines placement of a set of components and where each of the set of components is a UI element; and an application engine executing on the computer processor and configured to receive a broadcast message sent from a client computing device, identify, in the broadcast message, a reference to an external data provider, obtain an identifier of the in-message application from the external data provider, use the identifier to identify the set of components of the in-message application in the application repository, associate data obtained from the external data provider with a component of the set of components, and serve the broadcast message and the data to a consumer client, where the consumer client renders the in-message application based on the visual structure.

Various embodiments relate to a non-transitory computer-readable medium including instructions for using an in-message application. The instructions may include functionality to receive a broadcast message from a client computing device; identify, in the broadcast message, a reference to an external data provider; obtain an identifier of the in-message application from the external data provider; use the identifier to identify a set of components of the in-message application, where placement of the set of components is defined by a visual structure of the in-message application and where each of the set of components is a UI element; associate data obtained from the external data provider with a component of the set of components; and serve the broadcast message to a consumer client, where the consumer client renders the in-message application based on the visual structure.

Various embodiments relate to a computer system comprising at least one computer processor and at least one memory comprising instructions configured to cause the at least one computer processor to perform a method comprising receiving a selection for a card type from a corpus of card types stored on the computer system, the card type comprising a visual arrangement of a plurality of components, wherein at least one of the components is a UI element, the UI element configured to accept an input from a user; receiving a Uniform Resource Locator (URL); retrieving a first metatag in Hypertext Markup Language (HTML) associated with the URL, the first metatag indicating application programming interface (API) functionality associated with a third party; and generating a card template based on the card type and the first metatag, at least a portion of the card template associated with the API functionality indicated by the first metatag.

Various embodiments relate to a non-transitory computer-readable medium comprising instructions that cause a computer system to perform a method comprising receiving a selection of a card type from a corpus of card types stored on the computer system, the card type comprising a visual arrangement of a plurality of components, wherein at least one of the components is a UI element, the UI element configured to accept an input from a user; receiving a URL; retrieving a first metatag in HTML associated with the URL, the first metatag indicating API functionality associated with a third party; and generating a card template based on the card type and the first metatag, at least a portion of the card template associated with the API functionality indicated by the first metatag.

Various embodiments relate to a computer-implemented method for receiving a selection of a card type from a corpus of card types stored on the computer system, the card type comprising a visual arrangement of a plurality of components, wherein at least one of the components is a UI element, the UI element configured to accept an input from a user; receiving a URL; retrieving a first metatag in HTML associated with the URL, the first metatag indicating API functionality associated with a third party; and generating a card template based on the card type and the first metatag, at least a portion of the card template associated with the API functionality indicated by the first metatag.

Cards are a special kind of in-message application for including one or more predefined components and/or primitives into a representation of a message posted to a messaging system. A message created by one user and sent to another user through an application server of the messaging system can contain an address to a webpage located and accessed by a URL and can include metadata in plain readable text which are not displayed, e.g., in an Internet browser. The application server receives the URL of the web page, and checks the stored cards to determine whether or not a card instance for the web page have been created. If not, the application server can dispatch a "web crawl" to the web page (e.g., retrieve the web page), extract metadata embedded in the web page, and create a card instance for the web page to be stored in the stored cards. Developers can communicate with the application server to create web pages, e.g., by using various application program interfaces (APIs).

A card instance can be developed based on a card type provided by the card API proxy services (CAPS), where a developer can customize the card type to create a card instance identified by some metadata embedded within the web page. A card type contains an endpoint (e.g., a card API (CAPI) endpoint). A card type can also have a card visual arrangement, and its operations can be defined by a card logic components. A card type can be defined by the messaging platform. Alternatively, a card type can be defined by a developer or a user. CAPS may expose a consistent interface to the developer for each CAPI endpoint type. During the process of customizing a card type, the developer can preview the card developed, and update the card. The card can contain data and applications provided by a third party. As an example, the card can contain data and logic developed by a national sports league, a restaurant chain, etc.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that some embodiments may be practiced without these specific details common to other embodiments. In other instances, well-known features have not been described in detail to avoid unnecessarily complicating the description.

FIG. 1 is a schematic diagram illustrating a system comprising a messaging platform 100, a data provider 132, a developer client 140 including a builder 142 and a preview tool 144, and a consumer client 150 including a client application 156, a rendering module 152, and a template storage 154, in accordance with one or more embodiments. As shown in FIG. 1, messaging platform 100 has multiple components, including a frontend module 104, an application engine 102, an application repository 130, an application data repository 128, a routing module 108, a graph fanout module 110, a delivery module 112, a message repository 126, a connection graph repository 124, a stream repository 122, and an account repository 120. Various components of the system of FIG. 1 may be located on the same device (e.g., a server, mainframe, desktop personal computer (PC), laptop, personal digital assistant (PDA), telephone, mobile phone, kiosk, cable box, and any other device), or may be located on separate devices connected by a network (e.g., a local area network (LAN), the Internet, etc.). Those skilled in the art will appreciate that there may be more than one of each separate component running on a device, as well as any combination of these components within a given embodiment.

In various embodiments, messaging platform 100 is a platform for facilitating real-time communication between one or more entities. For example, messaging platform 100 may store millions of accounts of individuals, businesses, and/or other entities (e.g., pseudonym accounts, novelty accounts, etc.). One or more users of each account may use messaging platform 100 to send messages to other accounts inside and/or outside of messaging platform 100. Messaging platform 100 may be configured to enable users to communicate in "real time," e.g., to converse with other users with a minimal delay and to conduct a conversation with one or more other users during simultaneous sessions. In other words, messaging platform 100 may enable a user to broadcast messages and may display the messages to one or more other users within a reasonable time frame so as to facilitate a "live" conversation between the users. Recipients of a message may have a predefined "graph" relationship with an account of the user broadcasting the message. In various embodiments, the user is not an account holder or is not logged in to an account of messaging platform 100. In this case, messaging platform 100 may be configured to allow the user to broadcast messages and/or to utilize other functionality of messaging platform 100 by associating the user with a temporary account or identifier.

An in-message application can be an application for including one or more predefined components and/or "primitives" into a representation of a message posted to a messaging platform (e.g., messaging platform 100). The in-message application can include one or more data structures (e.g., a layout file, a template file, etc.) defining a visual structure of the components. In various embodiments, the in-message application is a public application available to multiple message authors for drafting messages using the in-message application.

In various embodiments, developer client 140 is a computing device used to create and publish an in-message application. Developer client 140 may be configured to create one or more primitives, components, and/or layouts in accordance with various embodiments. Developer client 140 can further enable a user to draft a broadcast message and/or to preview one or more unpublished in-message applications using preview tool 144. In various embodiments, developer client 140 can then publish the application to messaging platform 100 in response to user input. Publishing the application can include uploading one or more layouts to messaging platform 100 to be stored in application repository 130.

In various embodiments, developer client 140 can be any computing device capable of defining a visual structure of an in-message application, defining one or more components, defining one or more primitives, publishing an in-message application, previewing a broadcast message or in-message application, and/or posting a broadcast message to a messaging platform, e.g., messaging platform 100. Examples of a developer client 140 include, but are not limited to, a laptop computer, a desktop computer, a server computer, a netbook, a tablet computer, and any other computing device having communication capability with messaging platform 100. Developer client 140 can utilize any of a number of advantageous interfaces, including a web-based client, an SMS interface, an instant messaging interface, an email-based interface, an API function-based interface, and/or a JavaScript Object Notation (JSON) interface, etc., to communicate (e.g., via a computer network) with one or more components of messaging platform 100.

In various embodiments, builder 142 includes functionality to create a layout defining a visual structure of an in-message application. The layout can be implemented as any data structure or set of related data structures defining one or more attributes of a visual structure of an in-message application. In various embodiments, the layout includes component data defining placement of one or more components of an in-message application. For example, the layout may be implemented using one or more human readable text files containing the visual structure written in a platform-independent format (e.g., a markup language, such as an Extensible Markup Language). Any platform-independent format may be used, in accordance with various embodiments. In another example, the layout may be implemented as a compiled binary file (e.g., a "library") accessible to one or more applications (e.g., builder 142) executing on the developer client 140 and/or a component of messaging platform 100.

In various embodiments, the visual structure is platform-specific or is specific to a category of client computing devices. For example, the visual structure can be configured to be applicable only to tablet devices of a particular size. In another example, a developer can define separate visual structures for different screen sizes, such that messaging platform 100 responds to client requests with an appropriate visual structure based on information (i.e., screen dimensions) provided by client devices.

In various embodiments, a component is a UI element for use in an in-message application. Examples of a component may include, but are not limited to, an article summary component, an image slideshow component, an image grid component, a chart component, a map component, an ecommerce component, an audio playlist component, and a trigger component associated with an action (e.g., initiating purchase of a product, selecting a message as a favorite, rebroadcasting a message, etc.).

In various embodiments, the layout includes component data. Component data may include, in various embodiments, any data relevant to the placement, orientation, size, display, and/or attribute(s) of a component or one or more primitives associated with a component. For example, component data can include application data that is mapped to a particular component, such as text, images, videos, and/or URLs. Examples of component data may further include any other data relevant to the component, such as font size, font color, border information, margin information, and background color.

In various embodiments, a primitive is a basic building block of a component. Examples of a primitive can include, but are not limited to, an image, textbox, player, container (which can include other primitives), box, circle, oval, ellipse, triangle, button, checkbox, radio button, scroll bar, slide bar, and/or any other element capable of being displayed within a broadcast message.

In various embodiments, builder 142 includes functionality to upload the layout to messaging platform 100. Builder 142 may, for example, upload the layout to frontend module 104. Frontend module 104 may then send the layout to application engine 102 to be stored in application repository 130. In various embodiments, uploading the layout to messaging platform 100 is performed in response to a request to publish the in-message application.

In various embodiments, builder 142 includes functionality to receive an identifier assigned to the in-message application. The identifier may be assigned by builder 142 or a component of messaging platform 100 (e.g., application engine 102), in accordance with various embodiments. In various embodiments, the identifier can be embedded as metadata in an external resource (e.g., a web page) and may be used by messaging platform 100 to identify content intended for use with the in-message application. For example, a developer may embed metadata tags in a web page to indicate that content in the web page is intended for viewing with a particular in-message application. In this example, when a broadcast message is sent to messaging platform 100, it is parsed to identify a link to the external web page. The web page is then read to identify the identifier of the in-message application, and content from the web page is downloaded by application engine 102. Continuing the example, the broadcast message is posted and sent to multiple clients (along with the associated content) for viewing. Each client renders the in-message application according to the associated content and a visual structure of the in-message application.

In various embodiments, preview tool 144 includes functionality to create, in response to input from a user, a broadcast message including a reference to an external data provider (e.g., data provider 132). The broadcast message may include text, one or more references (e.g., a URL), emoticons, usernames, tags, objects, images, videos, and/or any other data insertable into a message, in accordance with various embodiments. Upon receiving the broadcast message, messaging platform 100 may post the broadcast message (i.e., message) and make the broadcast message available to one or more clients based on graph relationships between an authoring account of the message and one or more other accounts. The broadcast message may be sent to the client with additional content, formatting, and/or other data, in accordance with various embodiments. For example, the broadcast message may include an image/video thumbnail, a product description, a title of a news article, data corresponding to one or more components of an in-message application, and/or any other data. In various embodiments, the broadcast message is modified by messaging platform 100 prior to posting. For example, a URL may be replaced by a shortened URL or a summary of an article.

Examples of an external data provider may include a web service, a website, a server application, a mobile device of a user of the messaging platform, a data service and/or any other source of data accessible via a computer network (e.g., the Internet).

In various embodiments, preview tool 144 includes functionality to receive data obtained from the external data provider. In one example, application engine 102 downloads the data from the external data provider and provides the data to preview tool 144 via frontend module 104. In another example, preview tool 144 downloads the data to developer client 140 directly from data provider 132. The data may be obtained from the external data provider and provided to preview tool 144 from any other resource or component, in accordance with various embodiments. Examples of data obtained from the external data provider may include, but are not limited to, one or more of the following: image, video, thumbnail, graphic, animation, user name, display name, audio segment, text summary, product description, a number of words of a web page, analytics data, location information, text (e.g., a first paragraph) from an article or other web page, location coordinates from a mobile device of a user, and content relevant to an in-message application.

In various embodiments, preview tool 144 includes functionality to render, based on the visual structure of the in-message application, a preview of an in-message application including data obtained from the external data provider.

In various embodiments, preview tool 144 is configured to identify a user selection of a rendering environment. The rendering environment is the client environment that the preview tool 144 simulates in rendering the preview. Thus, for example, the user may select, using a user interface of the preview tool 144, Apple Corporation's iOS, Google Corporation's Android, Google Corporation's Chrome web browser, or any other client as the rendering environment. In various embodiments, preview tool 144 includes a template defining one or more parameters for each available rendering environment. The template may be any data structure or set of related data defining the output, display, and/or other requirements for simulating in-message applications in the corresponding rendering environment. The "simulation" of an in-message application can be a visual representation, approximation, and/or mock-up depicting one or more aspects of the visual appearance of the in-message application as it would appear when rendered on a client device, in accordance with various embodiments. In various embodiments, the preview functionality is performed entirely by developer client 140 (i.e., without server-side processing). Thus, the layout can be published after a preview of an in-message application is generated and approved by a developer using developer client 140.

Conversely, in various embodiments, generating a preview of an in-message application (i.e., simulating the in-message application) can involve receiving an actual broadcast message from messaging platform 100. In this case, the broadcast message may be visible only to preview tool 144 and may be generated based on a temporary identifier of a draft in-message application (e.g., using a draft layout, etc.). For example, preview tool 144 can upload a draft layout to application engine 102 (via frontend module 104) and can receive a temporary identifier assigned to the corresponding in-message application. In this example, preview tool 144 sends a broadcast message including a link to an external web page to the application engine 102. The web page can include the temporary identifier in metadata. In another example, builder 142 includes functionality to obtain application metadata from a user. In this example, for purposes of previewing an in-message application, preview tool 144 applies the user-supplied metadata to a web page linked to by the broadcast message. In this way, developers may not be required to modify any web pages (e.g., in order to include application metadata tags) in order to preview an in-message application.

In various embodiments, builder 142 includes functionality to receive, from the user, a request to publish the in-message application. Builder 142 can display a user interface including a preview of the in-message application along with an option to publish the application. The builder can also, In various embodiments, display a standalone option to publish the in-message application without preview.

In various embodiments, builder 142 includes functionality to publish the in-message application in response to the request. Publishing the application may include transmitting one or more items to application engine 102 via frontend module 104, in accordance with various embodiments. Examples of items transmitted to application engine 102 may include, but are not limited to, one or more layouts, one or more component definitions, identifiers of one or more components/primitives, application metadata (e.g., font, text size, color, etc.) and/or any other data required to deploy the in-message application to messaging platform 100.

In various embodiments, preview tool 144 includes functionality to receive, from the user, a request to post a previewed broadcast message. This request may be submitted concurrently with or separately from the publish request, in accordance with various embodiments. Preview tool 144 can then post the previewed broadcast message in response to the request from the user.

In various embodiments, developer client 140 includes a validator tool (not shown). The validator tool is configured to validate application metadata written for associating content in an external data provider with an in-message application. In various embodiments, the validator tool receives the application metadata from a user of the developer client, checks syntax, reads one or more values from the metadata (e.g., an identifier of an in-message application, identifiers of one or more components/primitives, etc.), and sends the values to application engine 102 (via frontend module 104) for confirmation. The validator tool then receives a message from application engine 102 confirming that the values match the definition of the in-message application and/or that all required values are present. If one or more of the values do not match the requirements/identifier of the in-message application, the validator tool receives an error message indicating the mismatched or unfound value(s). In various embodiments, if the in-message application has not yet been published, the validator performs the value matching locally (i.e., without sending the values to application engine 102 for validation). In various embodiments, the validator tool is configured to access one or more external data providers to confirm that data referenced within the metadata (e.g., data mapped to a component) is available and valid. If the validator tool determines that the data is unavailable or invalid, an error message can be displayed to a user of developer client 140. In various embodiments, the validator tool is a component of builder 142 or is a separate application communicatively coupled to builder 142. The validator tool can be implemented as a web application executing within a browser of developer client 140 or as a local client application, in accordance with various embodiments.

In various embodiments, developer client 140 includes all functionality and components of consumer client 150 (though not shown in FIG. 1), in addition to the functionality described with regard to builder 142 and preview tool 144.

In various embodiments, builder 142 is a software application or a set of related software applications configured to communicate with any number of other components (e.g., preview tool 144, application engine 102, and frontend module 104). Builder 142 can be implemented as a component or plugin to another client application, such as a messaging application.

In various embodiments, preview tool 144 is a software application or a set of related software applications configured to communicate with any number of other components (e.g., builder 142, application engine 102, and frontend module 104). Preview tool 144 can be implemented as a component of builder 142 or any other application executing on the client.

Builder 142 and/or preview tool 144 can be implemented as web applications configured to execute within a browser of developer client 140, in accordance with various embodiments. Alternatively, In various embodiments, builder 142 and/or preview tool 144 can be implemented as native client applications executing on developer client 140. Some or all of the functionality of builder 142 and/or preview tool 144 can be integrated within or performed by an operating system of developer client 140, in accordance with various embodiments.

In various embodiments, application engine 102 includes functionality to receive a visual structure of an in-message application. Application engine 102 can receive the visual structure in a platform-independent or platform-dependent form from a client computing device, in accordance with various embodiments. In various embodiments, application engine 102 receives a platform independent layout including the visual structure. Application engine 102 then converts the layout into one or more platform dependent templates, each template corresponding to an associated rendering environment of a client device. In various embodiments, application engine 102 includes functionality to send a template to a client in response to a request from the client. The template may then be utilized by the client to render the in-message application within a representation of one or more messages based on the visual structure. The layout and/or template may be platform independent or platform dependent and may include similar or identical information, in accordance with various embodiments.

In various embodiments, application engine 102 includes functionality to define one or more client-specific attributes of the visual structure. For example, application engine 102 may define specific dimensions and/or placement of one or more components of the in-message application for a predefined client environment. Thus, while the ordering, relative size, and/or relative orientation of one or more components can be included in the visual structure (e.g., in a platform independent form), the absolute dimensions, size, and/or ordering of the components may be assigned by application engine 102 for each client environment (e.g., in platform dependent form). Other examples of client-specific attributes defined by application engine 102 may include, but are not limited to, component sizes (e.g., a minimum or standard thumbnail image size for the client environment, minimum textbox height for the client environment, etc.), font information, color information (e.g., where screen size/resolution affects readability of fonts/colors), and/or any other client-specific data associated with rendering an in-message application. In various embodiments, the client-specific attributes are sent to developer client 140 for approval by a user who created the in-message application. Alternatively, In various embodiments, the client-specific attributes are manually defined by the user of developer client 140 or a representative of messaging platform 100 using an interface to application engine 102.

In various embodiments, application engine 102 includes functionality to assign an identifier to an in-message application. Application engine 102 may assign the identifier in response to receiving a layout from a client computing device (e.g., when the in-message application is published). The identifier may be any method of uniquely referencing and/or identifying the in-message application (e.g., a randomly assigned unique numeric value).

In various embodiments, application engine 102 includes functionality to obtain data from the external data provider (e.g., data provider 132). Application engine 102 may download the data according to a predefined protocol for accessing external resources. For example, application engine 102 may read a web page, parse metadata tags from the web page, and store text, images, videos, and/or other content from the web page in application data repository 128. In another example, application engine 102 downloads data in JavaScript Object Notation (JSON) format from an external data service. In this example, the JSON blob includes metadata identifying an in-message application and various different components of the in-message application, as well as data associated with those components. Examples of data downloaded by the external data provider can include, but are not limited to, web pages (e.g., a news article, blog post, etc.), images, videos, text, files (e.g., a markup file), and/or any other data.

In various embodiments, application engine 102 includes functionality to receive a broadcast message from a client computing device (e.g., consumer client 150). In various embodiments, application engine 102 receives the broadcast message in conjunction with a request to post the broadcast message to messaging platform 100. The broadcast message may include a text string entered by a user, one or more URLs or other references, and/or any other content (e.g., images, video, audio) that can be included in a message posted to messaging platform 100. In one example, a user of consumer client 150 authors the following broadcast message: "Check out the latest news on our blog! http://blog.twitter.com/."

In various embodiments, application engine 102 includes functionality to identify, in the broadcast message, a reference to an external data provider (data provider 132). The reference may be a URL or other data pointing to a location accessible via a computer network. For example, the reference may point to an address of a web page, such as http://blog.twitter.com/2012/12/when-musicians-talk-theworldislistening.html. Data provider 132 can be any external source of data accessible by one or more components of messaging platform 100 and/or a client computing device. For example, data provider 132 may be a resource or location in a web server or a set of related web servers of a network distributed system.

In various embodiments, application engine 102 includes functionality to obtain the identifier of an in-message application from the external data provider (e.g., data provider 132). Application engine 102 may access a resource provided by data provider 132 in response to identifying a reference to the resource in a broadcast message sent from a client computing device. For example, application engine 102 can read a web page hosted by data provider 132 and then parse the web page to identify one or more metadata tags, as follows:

<meta name="twitter:card" content="summary">

In this example, the metadata tag named "twitter:card" includes the identifier "summary," which uniquely identifies an in-message application. Any other type of identifier, file format, or protocol may be used to identify the in-message application, in accordance with various embodiments In various embodiments, application engine 102 includes functionality to use the identifier to identify a visual structure of the in-message application, where the visual structure defines placement of a set of components. The visual structure can be stored in application repository 130 in any form, in accordance with various embodiments. For example, the visual structure may be stored as a file in a distributed file system or a database management system (DBMS).

In various embodiments, application engine 102 includes functionality to associate data obtained from the external data provider (e.g., data provider 132) with a component of the set of components. In various embodiments, the mappings (e.g., metadata tags) of data to one or more components of the in-message application are included in the data downloaded from the external data provider. Application engine 102 can be configured to read and then store the mappings and the associated data in application data repository 128. The data can include one or more of the following: photos, images, videos, text, and/or other content obtained from data provider 132 and stored in application data repository 128.

In various embodiments, application engine 102 includes functionality to serve application data to a consumer client, where the consumer client renders the in-message application based on the application data and a visual structure. In various embodiments, the visual structure, corresponding data, and/or the reference to the external data provider can be sent to the client separately from the broadcast message. In various embodiments, the client (e.g., client application 156) includes functionality to obtain some or all of the associated data from the external data provider directly using the reference.

In various embodiments, messaging platform 100 includes functionality to send (via frontend module 104 and application engine 102) the broadcast message, associated data, and/or visual structure to a consumer client. In various embodiments, the visual structure and/or client-specific attributes of the visual structure are sent to the client separately (e.g., in a platform dependent format). For example, messaging platform 100 can send a template file including the visual structure and client-specific attributes to the client in response to a request. In this example, the client caches the template and uses the template to render the in-message application.

In various embodiments, consumer client 150 is a computing device used to create and publish an in-message application. Consumer client 150 may be configured to download one or more message streams, including any number of broadcast messages from frontend module 104. Consumer client 150 can then display the broadcast messages to a user. If the broadcast message is associated with an in-message application, consumer client 150 can render the in-message application within a representation of the broadcast message using data associated with the in-message application (e.g., a template). Consumer client 150 can be configured to render the in-message application using a web browser, a mobile application, or any other client application 156, in accordance with various embodiments.

In various embodiments, consumer client 150 can be any computing device capable of displaying one or more broadcast messages to a user. Examples of consumer client 150 may include, but are not limited to, a laptop computer, a desktop computer, a server computer, a netbook, a tablet computer, and any other computing device having communication capability with messaging platform 100. Consumer client 150 can utilize any of a number of advantageous interfaces, including a web-based client, an SMS interface, an instant messaging interface, an email-based interface, and an API function-based interface, to communicate (via a computer network) with one or more components of messaging platform 100.

In various embodiments, client application 156 includes functionality to download a broadcast message including data obtained from an external data provider (e.g., data provider 132). For example, the broadcast message may be sent in JSON format. In various embodiments, client application 156 includes functionality to identify, based on the broadcast message, an identifier of an in-message application. Client application 156 can be configured to extract the identifier from the broadcast message or data associated with the broadcast message.

In various embodiments, client application 156 includes functionality to determine that a template corresponding to the in-message application is not stored in template storage 154. In various embodiments, the template is a set of platform dependent data including the visual structure and/or one or more client-specific attributes of the visual structure.

In various embodiments, client application 156 includes functionality to download the template from messaging platform 100 (e.g., via frontend module 104) in response to determining that the platform dependent template is not stored in template storage 154. Client application 156 can be configured to then store the template in template storage 154.

In various embodiments, rendering module 152 includes functionality to render the in-message application based on the template. Rendering the in-message application can include generating a visual representation of the broadcast message. The visual representation can include any combination of primitives, components, text, images, video, graphics, animations, user interface controls (e.g., buttons, check boxes, text boxes, menus, etc.), and other relevant content.

In various embodiments, client application 156 includes functionality to identify an action associated with the in-message application. An action can be performed in response to a calculated engagement metric (discussed below) and/or a user's engagement with a component of the broadcast message. In various embodiments, multiple actions can be performed in response to a single user engagement. Examples of a user engagement can include, but are not limited to, rebroadcasting a message, favoriting/liking a message, replying to a message, selecting a purchase option in a component of the broadcast message, selecting a vote option in a component of the broadcast message, entering a bid to purchase a product in a component of the broadcast message, selecting a purchase option in a component of the broadcast message, and selecting an audio playback option in a component of the broadcast message.

In one example, a broadcast message includes a survey component that requests input from a user. The survey component includes an option to select one of three different radio buttons and a "submit response" button. After a user selects one of the radio buttons and clicking the "submit response" button, client application 156 performs the action of sending the selected data (i.e., the survey response) to application engine 102 via frontend module 104. In this example, application engine 102 then aggregates the data and provides a report including results based on the aggregated data to the authoring account of the broadcast message. In various embodiments, the action is associated not with a particular component, but with one or more pre-defined engagements with the broadcast message. Examples of an action performed in response to user input can include, but are not limited to, sending a coupon to an account of a user in response to detecting that the user has favorited, liked, rebroadcast, or replied to the broadcast message, unlocking a promotional offer in response to detecting a predefined number of purchase requests, updating a chart component of the broadcast message in response to detecting selection of a vote button in another component of the message, initiating audio playback (e.g., of a stream or single file) in response to detecting selection of a play button in a component, submitting a location coordinate, establishing a follower/friend/subscriber relationship between an account of a user of the consumer client and an authoring account of the broadcast message, and/or any other action associated with a user input.

In various embodiments, client application 156 includes functionality to send a request to perform one or more actions to messaging platform 100. The request may be received and handled by application engine 102 or any other component of messaging platform 100, depending on the type of action requested. Actions and/or various steps of a single action can be performed by client application 156 and/or a component of messaging platform 100 (e.g., application engine 102), in accordance with various embodiments.

In various embodiments, client application 156 is a web browser and does not require a platform dependent template in order to render in-message applications. Instead, the web browser receives broadcast messages sent from a web API of frontend module 104 and renders relevant in-message applications within a browser window. The broadcast messages sent for display in a web browser are sent with associated rendering data interpretable and executable by a standard web browser. As a result, in various embodiments, no template storage 154 exists when client application 156 is a web browser. Alternatively, In various embodiments, template storage 154 is a cache of the web browser and stores data associated with rendering one or more in-message applications.

In various embodiments, application engine 102 includes functionality to aggregate a set of engagement data associated with one or more in-message applications. Application engine 102 can be configured to obtain engagement data from any number of consumer clients. Engagement data can include, but are not limited to, number of expanded views of a broadcast message, number of votes submitted by a survey component, number of favorites/likes/rebroadcasts of a broadcast message, number of purchases made using a purchase component of a broadcast message, number of in-message applications using a custom component and data from each of those in-message applications, number of clicks per broadcast message and/or component, referral statistics/analytics for one or more external web pages linked to by a broadcast message, and any other aggregated data associated with an in-message application.

In various embodiments, application engine 102 includes functionality to calculate one or more engagement metrics based on the engagement data. An engagement metric can be any value representing one or more types of engagement with an in-message application. Examples of an engagement metric can include, but are not limited to, an average number of seconds per session of a streaming audio component, a total number of votes for a survey option, an average number of views per broadcast message, a number of rebroadcasts/likes/favorites/etc. of a broadcast message, and/or any other value derived from engagement data. In various embodiments, application engine 102 includes functionality to compare an engagement metric with a predefined threshold. Application engine 102 can be configured to determine that the engagement metric exceeds (or meets) the threshold. In various embodiments, application engine 102 and/or client application 156 is configured to perform an action in response to determining that the threshold is exceeded (or met).

In various embodiments, application engine 102 includes functionality to provide a report including one or more calculated engagement metrics. The report can be provided to an authoring account of a broadcast message using an in-message application and/or any other entity authorized by a user of the account, in accordance with various embodiments.

In various embodiments, application engine 102 includes functionality to maintain permissions data. Application engine 102 can be configured to enable or disable content from specific data providers and/or in-message applications based on the permissions data. In various embodiments, application engine 102 is configured to receive permissions data and/or updates to permissions data from an administrator (e.g., an employee of the messaging platform or a user of a specific account). For example, application engine 102 can maintain a whitelist and blacklist of data providers. In this example, each data provider is identified by a domain name and an identifier of its account with the messaging platform. Application engine 102 allows whitelisted data providers to have access to in-message applications, while blocking blacklisted data providers from usage of in-message applications.

In various embodiments, application engine 102 is a software application or a set of related software applications configured to execute on one or more hardware processors (e.g., processor 802 of FIG. 8, discussed below). Application engine 102 can be a web application in a server of a data center and/or a cloud computing application in a network distributed system. Alternatively, one or more components of application engine 102 can reside in a personal computing device of a user (e.g., developer client 140 and consumer client 150).

In various embodiments, one or more of the data repositories (message repository 126, connection graph repository 124, stream repository 122, account repository 120, application repository 130, and application data repository 128) may be a database and/or storage service residing on one or more servers. For example, one or more of the data repositories may be implemented as a storage service that uses service-oriented architecture (SOA) and is configured to receive requests for data and to provide requested data to other components of messaging platform 100. In another example, message repository 126 may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments.

In various embodiments, one or more of the data repositories (message repository 126, connection graph repository 124, stream repository 122, account repository 120, application repository 130, and application data repository 128) may be a separate application or set of applications residing on one or more servers external (and communicatively coupled) to messaging platform 100. Alternatively, In various embodiments, one or more of the data repositories may be an integrated component of messaging platform 100 and/or may reside, either partially or entirely, on one or more common hardware devices (e.g., a server).

In various embodiments, routing module 108 includes functionality to receive one or more messages and to store the messages in message repository 126. Routing module 108 may be configured to assign an identifier to the message and to notify graph fanout module 110 of a sender of the message.

In various embodiments, graph fanout module 110 includes functionality to retrieve graph data from connection graph repository 124 and to use the graph data to determine which accounts in messaging platform 100 should receive the message. The graph data, for example, can reflect which accounts in the messaging platform are "following" a particular account and are, therefore, subscribed to receive status messages from the particular account.

In various embodiments, delivery module 112 includes functionality to receive a list of accounts from graph fanout module 110 and the message identifier generated by routing module 108 and to insert the message identifier into stream data associated with each identified account. Delivery module 112 may then store the message list in stream repository 122. The stream data stored in stream repository 122 can make up one or more streams associated with one or more accounts of messaging platform 100. A stream may be a dynamic list of messages associated with one or more accounts or can reflect any arbitrary organization of messages that is advantageous for the user of an account.

In various embodiments, frontend module 104 is a software application or a set of related software applications configured to communicate with external entities (e.g., data provider 132, developer client 140, and consumer client 150). Frontend module 104 may include an API and/or any number of other components used for communicating with entities outside of messaging platform 100. The API may include any number of specifications for making requests from and/or providing data to messaging platform 100. For example, a function provided by the API may provide broadcast messages to a consumer client (e.g., consumer client 150).

In various embodiments, frontend module 104 is configured to use one or more of the data repositories (e.g., message repository 126, connection graph repository 124, stream repository 122, and/or account repository 120) to define streams for serving messages (i.e., stream data) to a user of the account on messaging platform 100. A user can use any client (e.g., consumer client 150) to receive the messages. For example, where the user uses a web-based client to access messaging platform 100, an API of frontend module 104 can be utilized to define one or more streams and/or to serve the stream data to the client for presentation to the user. Similarly, different forms of message delivery can be handled by different modules in frontend module 104. In various embodiments, the user can specify particular receipt preferences, which are implemented by frontend module 104.

Figure 2:
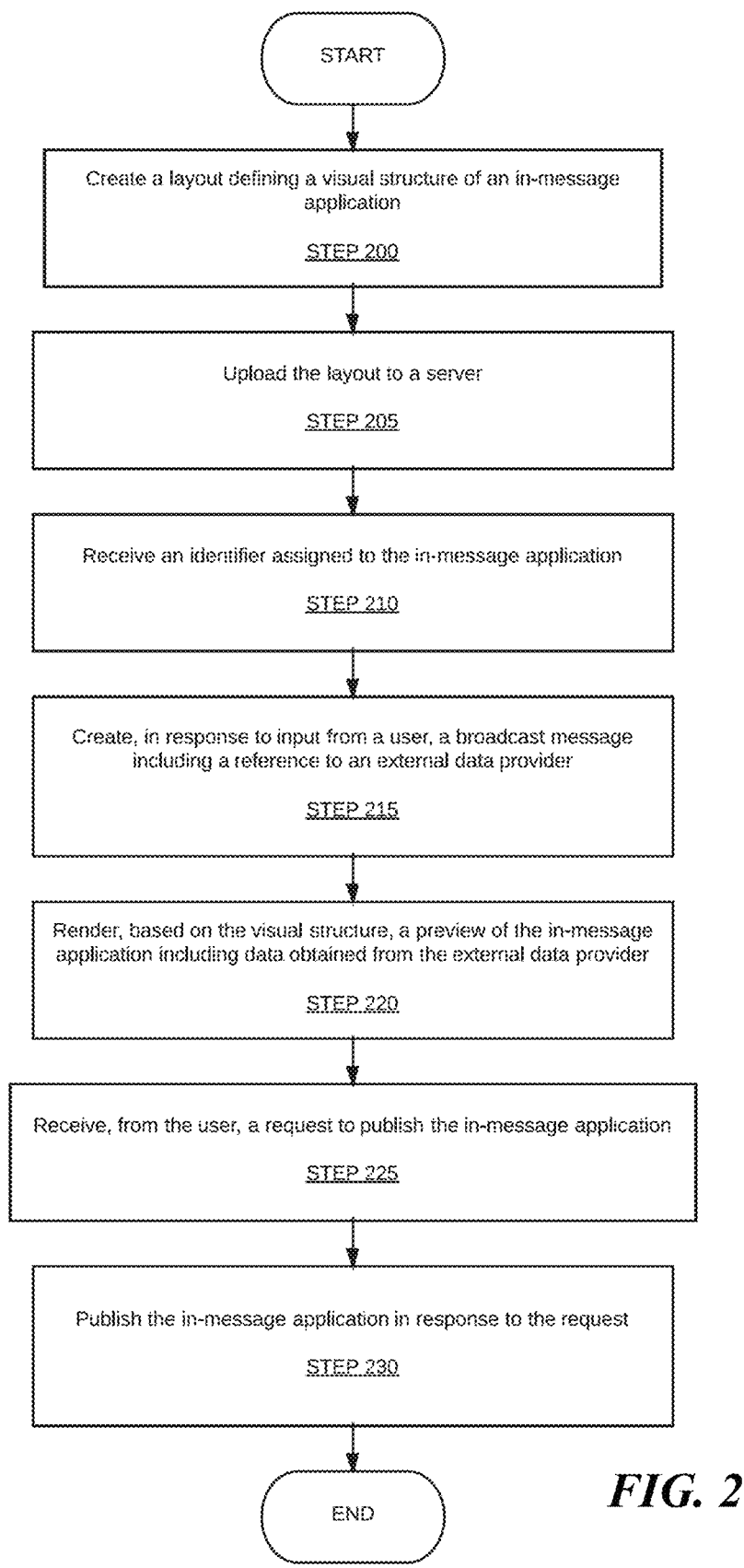
FIGS. 2-4 are flowcharts for methods performed in accordance with one or more embodiments.

FIG. 2 shows a flowchart of a method for using an in-message application. While the various steps in this flowchart are presented and described sequentially, one of ordinary skill in the art will appreciate that some or all of the steps may be executed in different orders and some or all of the steps may be executed in parallel. Further, In various embodiments, one or more of the steps described below may be omitted, repeated, and/or performed in a different order. Accordingly, the specific arrangement of steps shown in FIG. 2 should not be construed as limiting the scope of the embodiment.

In block 200, a layout defining a visual structure of an in-message application is created. The layout can be created by an administrator of a messaging platform or by a third party developer, in various embodiments. In block 205, the layout is then uploaded to a server. In various embodiments, the server is a component of a messaging platform (e.g., frontend module 104 of FIG. 1, discussed above).

In block 210, an identifier assigned to the in-message application is received. The identifier can be a temporary identifier or a permanent identifier and can be assigned by the server or client, in accordance with various embodiments. For example, a developer client can request the identifier from the server and display the identifier to a developer using the client. In this example, the developer then uses the identifier as metadata in one or more web pages. In another example, the developer client submits a request to the server to publish an in-message application. In this example, the server responds to the client with the identifier upon publishing the in-message application.

In block 215, a broadcast message including a reference to an external data provider is created in response to input from a user. In various embodiments, the broadcast message is authored by a user of the developer client either prior to or after publishing the in-message application. For example, the broadcast message can include a URL and some user-entered text, as follows: "Check out this link! http://blog.twitter.com/."

In block 220, a preview of the in-message application is rendered based on the visual structure. In various embodiments, the preview includes data (i.e., content) obtained from the external data provider. Rendering the preview can involve obtaining content and metadata from the external data provider. For example, metadata obtained from the external data provider can map the content to one or more components of the in-message application. The preview can then be rendered by displaying the content within the associated components (e.g., according to a predefined visual structure). In various embodiments, the metadata can include an identifier of the in-message application.

In various embodiments, no identifier of the in-message application is required in order to preview an in-message application. For example, content from the external data provider can explicitly be mapped (e.g., by a user of a preview UI) to the in-message application without the use of an identifier. In one example, a user creates a layout defining a visual structure of an in-message application using a builder tool executing on a developer client. In this example, the builder displays an option to preview the in-message application. Upon selecting the option, a new UI is displayed in which the user enters a broadcast message including a URL. The builder obtains metadata from an external data provider referenced by the URL and uses the metadata to map content from a web page to components of the in-message application. The preview of the in-message application is then rendered accordingly.

In block 225, a request to post the broadcast message is received from the user. For example, the request can be obtained from a user interface simultaneously displaying the preview. In block 230, the broadcast message is posted in response to the request. Posting the broadcast message can involve sending the broadcast message to frontend module 104 to be fanned out to any number of accounts having a predefined graph relationship with the posting account.

Figure 3:
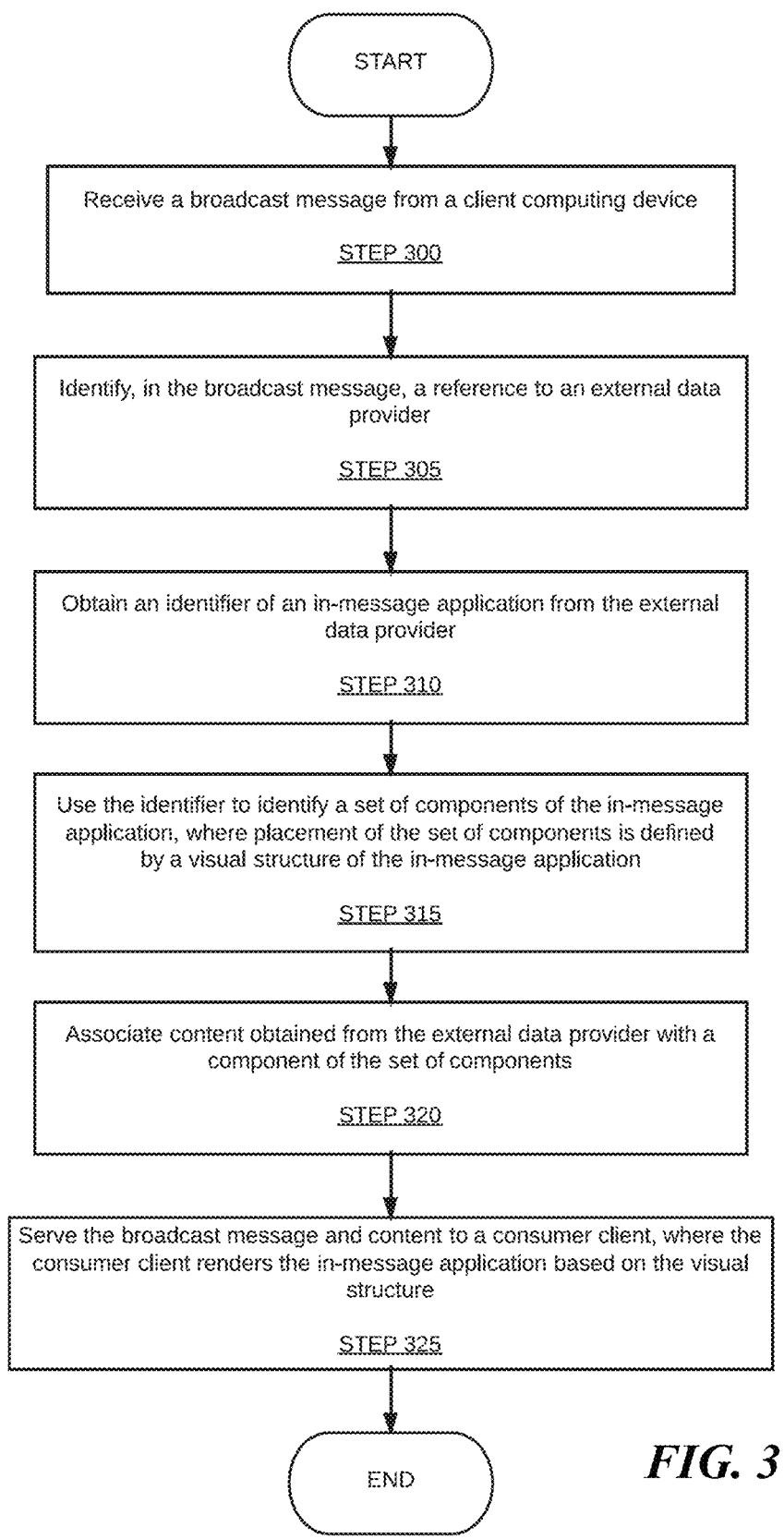

FIG. 3 shows a flowchart of a method for using an in-message application. While the various steps in this flowchart are presented and described sequentially, one of ordinary skill in the art will appreciate that some or all of the steps may be executed in different orders and some or all of the steps may be executed in parallel. Further, In various embodiments, one or more of the steps described below may be omitted, repeated, and/or performed in a different order. Accordingly, the specific arrangement of steps shown in FIG. 3 should not be construed as limiting the scope of the embodiment.

In block 300, a broadcast message is received from a client computing device. The broadcast message can be received by a component of a messaging platform (e.g., frontend module 104 of FIG. 1, discussed above) and can be authored by a user of a client computing device or can be automatically generated by a software application. For example, a software application can be configured to automatically generate and post a broadcast message for each new article posted to a website of a periodical or news organization.

In block 305, a reference to an external data provider is identified in the broadcast message. The reference can be identified by parsing the broadcast message and identifying text formatted according to a predefined syntax. An identifier of an in-message application is obtained from the external data provider (block 310) (e.g., from metadata in a web page), and the identifier is used to identify a visual structure of the in-message application (block 315). Obtaining the identifier may involve making a predefined API call to the external data provider or reading data from a resource residing on the external data provider. Additional metadata, including one or more mappings of content to components of the in-message application, can be obtained from the external data provider and/or from one or more other resources referenced by the external data provider, in accordance with various embodiments.

In block 320, content obtained from the external data provider is associated with at least one component of the set of components. In various embodiments, content can be obtained concurrently with, prior to, or after obtaining the metadata. Furthermore, content can be obtained from the same external provider referenced by the broadcast message, or from any other resource, in accordance with various embodiments. Thus, In various embodiments, one or more of blockS 310-320 can be performed concurrently or in any different order. For example, a web page can be read in its entirely from a web server. In this example, the web page is then parsed and specific content is then downloaded from the web server as required by the in-message application. In another example, the external data provider is a repository storing all required information (e.g., metadata, content, and/or identifier) in one or more accessible files. The entire set of files is downloaded and subsequently read to identify the required information. In various embodiments, content mapped to one or more components is obtained from the external data provider by the messaging platform, the client, or both (e.g., depending on the availability of the content).

In block 325, the broadcast message and content are served to a consumer client. The consumer client renders the in-message application based on the visual structure. In various embodiments, the broadcast message can be sent to the consumer client in response to a request received from the consumer client and in any number of separate messages. For example, the content associated with one or more components can be sent in any number of messages and from any number of different sources. In another example, broadcast messages are constructed and stored in a message repository and application data is stored in an application data repository. In this example, upon receiving a request to serve the message to a client, if the message is associated with an in-message application, required application data is retrieved from the application data repository and sent to the client in conjunction with the requested broadcast message.

Figure 4:
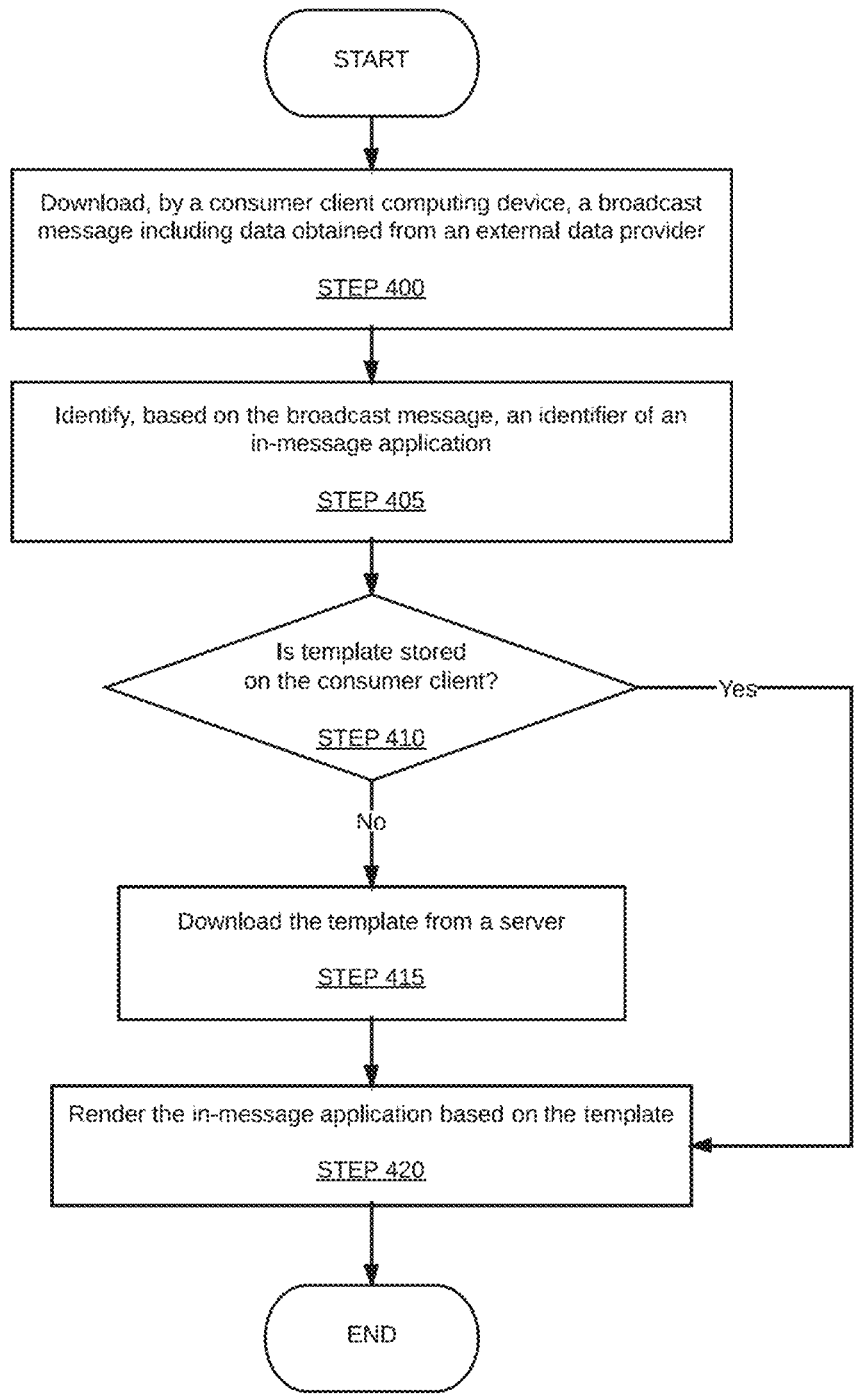

FIG. 4 shows a flowchart of a method for using an in-message application. While the various steps in this flowchart are presented and described sequentially, one of ordinary skill in the art will appreciate that some or all of the steps may be executed in different orders and some or all of the steps may be executed in parallel. Further, In various embodiments, one or more of the steps described below may be omitted, repeated, and/or performed in a different order. Accordingly, the specific arrangement of steps shown in FIG. 4 should not be construed as limiting the scope of the embodiment.

In block 400, a broadcast message including data obtained from an external data provider is downloaded by a consumer client. The broadcast message can be downloaded at once, or in separate parts, in accordance with various embodiments. For example, content mapped to various components, dynamic content (e.g., time-sensitive content such as weather, stock quotes, etc.), content obtained from different data providers, and/or various other parts of the broadcast message can be downloaded by the client before, during, and/or after rendering of the in-message application.

In block 405, an identifier of an in-message application is identified based on the broadcast message. For example, the identifier can be identified as a numerical value within or otherwise associated with the broadcast message.

In block 410, it is determined whether a template corresponding to the in-message application is stored on the consumer client. The template can be any data structure or set of related data structures defining at least a portion of the visual structure of the in-message application. For example, in a web-based client, the template can be stored within the cache of a web browser. Alternatively, in another example, the web-based client does not require use of a template, and blockS 410 and 415 are skipped (e.g., the visual structure is sent to the client in conjunction with the broadcast message). Templates may be platform-specific, required, optional, or not utilized, depending on a platform of the client, in accordance with various embodiments. If it is determined that the template is stored on the client, the process proceeds to block 420. If it is determined that the template is not stored on the client, the process proceeds to block 415.

In block 415, the template is downloaded from a server. In various embodiments, the template can be downloaded at any time based on availability, network connectivity of the client, modifications to the template that are pushed/pulled from the server, and/or any other reason.

In block 420, the in-message application is rendered based on the template. For newly obtained content or modifications to existing content, In various embodiments, the in-message application is re-rendered in response to obtaining the new content. In one example, a rendering of the in-message application is updated to include different content as the content becomes available and/or when the external content changes.

In one example, a broadcast message can be displayed without rendering the in-message application due to the template not being available at the time the message is displayed. In this example, the broadcast message is simply posted as a textual message and/or a message without any content relevant to an in-message application. The URL of the external data provider can be used to perform any form of message expansion, but no application-specific rendering is performed. Continuing the example, upon receiving the template from the server, the client renders the in-message application using content mapped to specific components and based on the visual structure defined by the template. Furthermore, application logic, actions, and/or other functionality is enabled and ready for user engagement. Thus, in this example, a much richer message is presented to the user.

The following section describes various examples of embodiments. The examples are included to aid in the understanding of the embodiments but are not intended to limit the scope of the embodiments.

In one example, a developer uses a client computing device (i.e., a developer client) to launch a builder application. Using the builder application, the developer creates a layout defining an in-message application. In this example, the developer uses a user interface of the builder to drag predefined components onto a grid depicting the visual structure of an in-message application. Each component is represented according to its predefined size (relative to the grid), and the user can edit the components or define attributes of each component by double-clicking on the component representation within the grid.

Continuing the example, after placing a set of components, the developer sets attributes of the components. By double-clicking on a survey component, the developer is shown a user interface including a user interface for defining survey options. The developer maps a first survey option to the metadata tag "HomeTeam" and maps a second survey option to the metadata tag "AwayTeam." Returning to the grid view, the developer enters the message "Name your pick for tonight's game!" into a text component of the in-message application. A URL component of the in-message application maps a text sub-component to the HTML title tag and a thumbnail sub-component to the metadata tag "URLthumb".

Continuing the example, the developer creates a web page including the metadata tags "HomeTeam," "AwayTeam," and "URLthumb." The article is a sports article discussing an upcoming basketball game between the Boston Celtics and the Los Angeles Lakers. Thus, the following metadata tags are defined within the HTML web page:

<meta name="twitter:HomeTeam" content="Los Angeles Lakers">
<meta name="twitter:AwayTeam" content="Boston Celtics">
<meta name="twitter:URLthumb" content="http://sports.sample.com/images/2012/12/19/Celtics-Lakers-thumb.jpg>

Furthermore, the title tag is defined as follows: "<title>Celtics and Lakers Clash in LA</title>." Continuing the example, the developer selects an option to preview the in-message application and enters a broadcast message including a URL of the web page into a message composition box. Upon selecting a preview option, the broadcast message is parsed to identify the URL and the web page is read by a preview tool. The preview tool extracts the metadata tag values and assigns them to their corresponding components. Furthermore, the preview tool fetches the thumbnail image from the location specified by the URLthumb tag (i.e., "http://sports.sample.com/images/2012/12/19/Celtics-Lakers-thumb.jpg"). The preview tool then renders the resulting preview by displaying the components and content within a preview dialog, based on the predefined visual structure.

Continuing the example, the developer then selects an option to publish the in-message application using the builder tool. In response, the builder sends a platform independent layout file containing markup describing the layout of the in-message application to a messaging platform. The messaging platform registers the published in-message application by assigning a unique identifier to the in-message application and making the application available to one or more authorized users of the messaging platform. In this example, the authorized users/accounts are selected by the developer and included in the publish request.

Continuing the example, a weekly web page for upcoming basketball games is updated to include the required metadata tags of the in-message application. Each week, after the web page is published, an employee of the publication logs into an account of the messaging platform and authors a new broadcast message including a URL of the web page. Upon posting, the broadcast message is fanned out to hundreds of fans, subscribers, and affiliates of the authoring account (based on their graph relationship with the account). The in-message application is rendered by various different client computing devices for display to users of those devices. The rendering is performed according to a platform dependent template (corresponding to each platform) that is cached on the client devices and includes the visual structure of the in-message application.

Figure 5A:
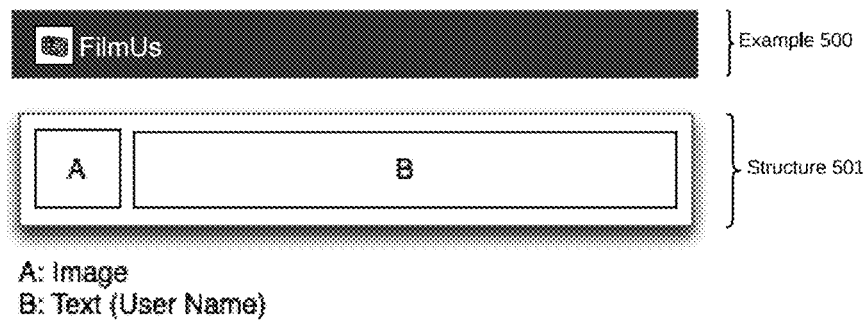

FIGS. 5A-5G depict examples of various different components, in accordance with various embodiments. FIG. 5A depicts an example (500) and structure (501) of an attribution component. This component includes two primitives (an image and a textbox) and has the following required metadata tags: user_id, user_image, user_name, background_color, and font_color. The attribution is intended to attribute the broadcast message to an account of the messaging platform.

Figure 5B:
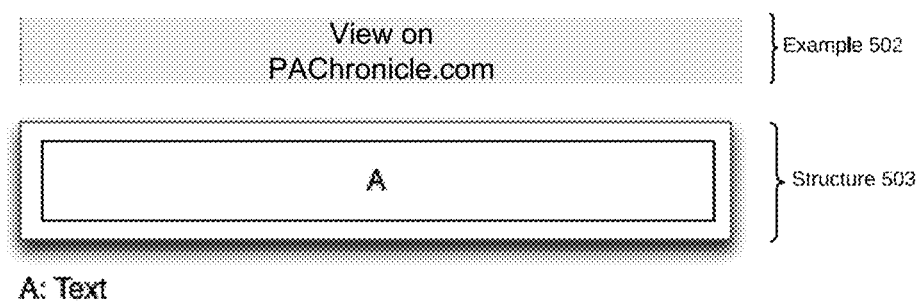

FIG. 5B depicts an example (502) and structure (503) of a footer component. This component includes a single primitive (a text box) and is configured to display a URL in a footer of the broadcast message. The following are required metadata tags: url, text, and color.

Figure 5C:
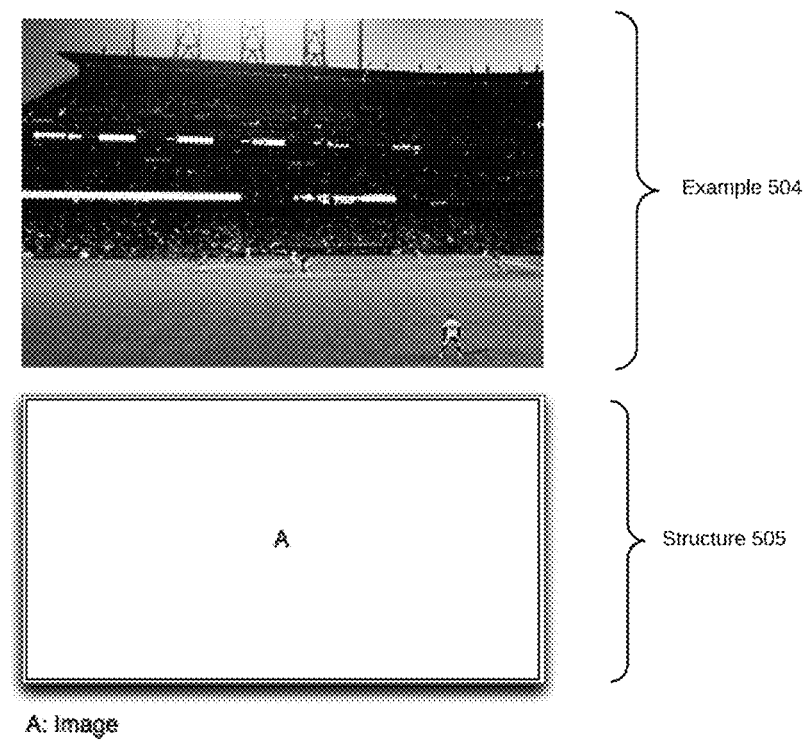

FIG. 5C depicts an example (504) and structure (505) of a large image component. This component includes a single primitive (an image) and is configured to display the image referenced by a provided URL (i.e., via a metadata tag).

Figure 5D:
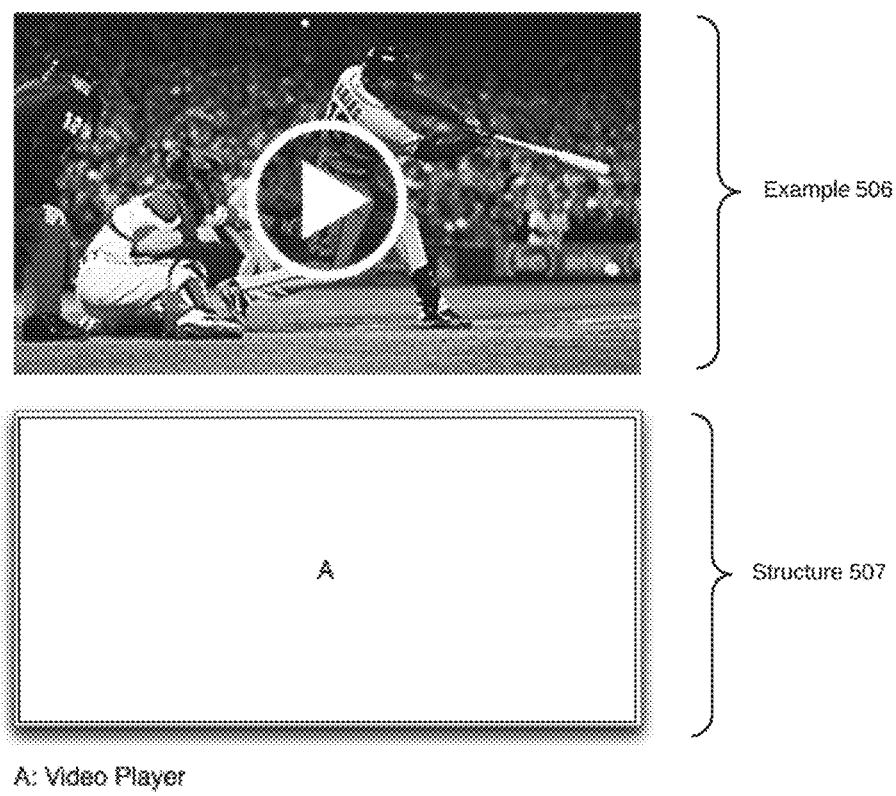

FIG. 5D depicts an example (506) and structure (507) of a large video component. This component includes a single primitive (a video) and is configured to allow video playback within the body of a broadcast message. The required metadata tags are as follows: url, preview_image, stream, stream_content_type, stream_width, and stream_height. The "preview_image" tag designates an image thumbnail that will represent the video before playback is initiated; the "stream" and "stream_content_type" tags define a URL and format of the corresponding video, respectively. The "url" tag is a URL to a web page including the video.

Figure 5E:
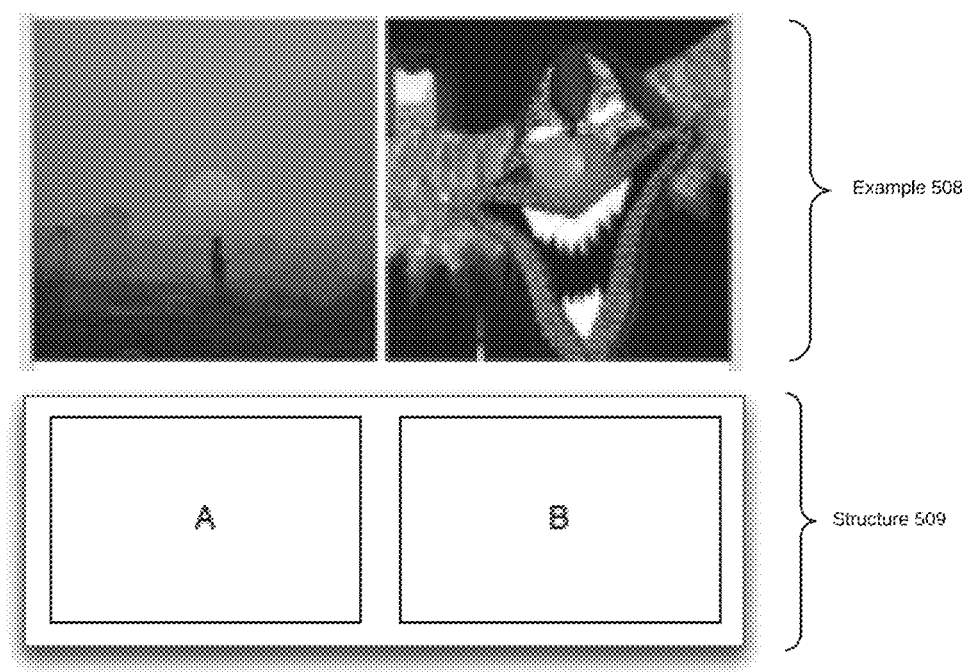

FIG. 5E illustrates an example (508) and structure (509) of a double image component. This component includes two primitive images and is configured to display the two images side by side within an in-message application. In the depicted example, components of an in-message application can only be stacked vertically by developers in a layout, and thus, the double image component and other horizontally stacked compound components allow developers to utilize the entire area of the visual structure. The double image component includes the following metadata tags: url1, url2, image1, and image2.

FIG. 5F depicts an example (510) and structure (511) of a title/description/byline component. This component includes three primitives (three textboxes) and is configured to display a title, description, and attribution of an article. The title/description/byline component includes the following metadata tags: url, title, description, creator_user_id (a numerical identifier of an account), creator_user_name (a unique screen name of the account), and creator_user_screen_name (a display name of the account).

FIG. 5G depicts an example (512) and structure (513) of a title/description/byline/image component. This component includes four textbox primitives (a title textbox, a description textbox, a byline textbox, and a thumbnail image) and is configured to display a title, description, attribution, and thumbnail image of an article. The title/description/byline/image component includes the following metadata tags: url, title, description, creator_user_id, creator_user_name, creator_user_screen_name, and image (a URL of the image).

Figure 6A:
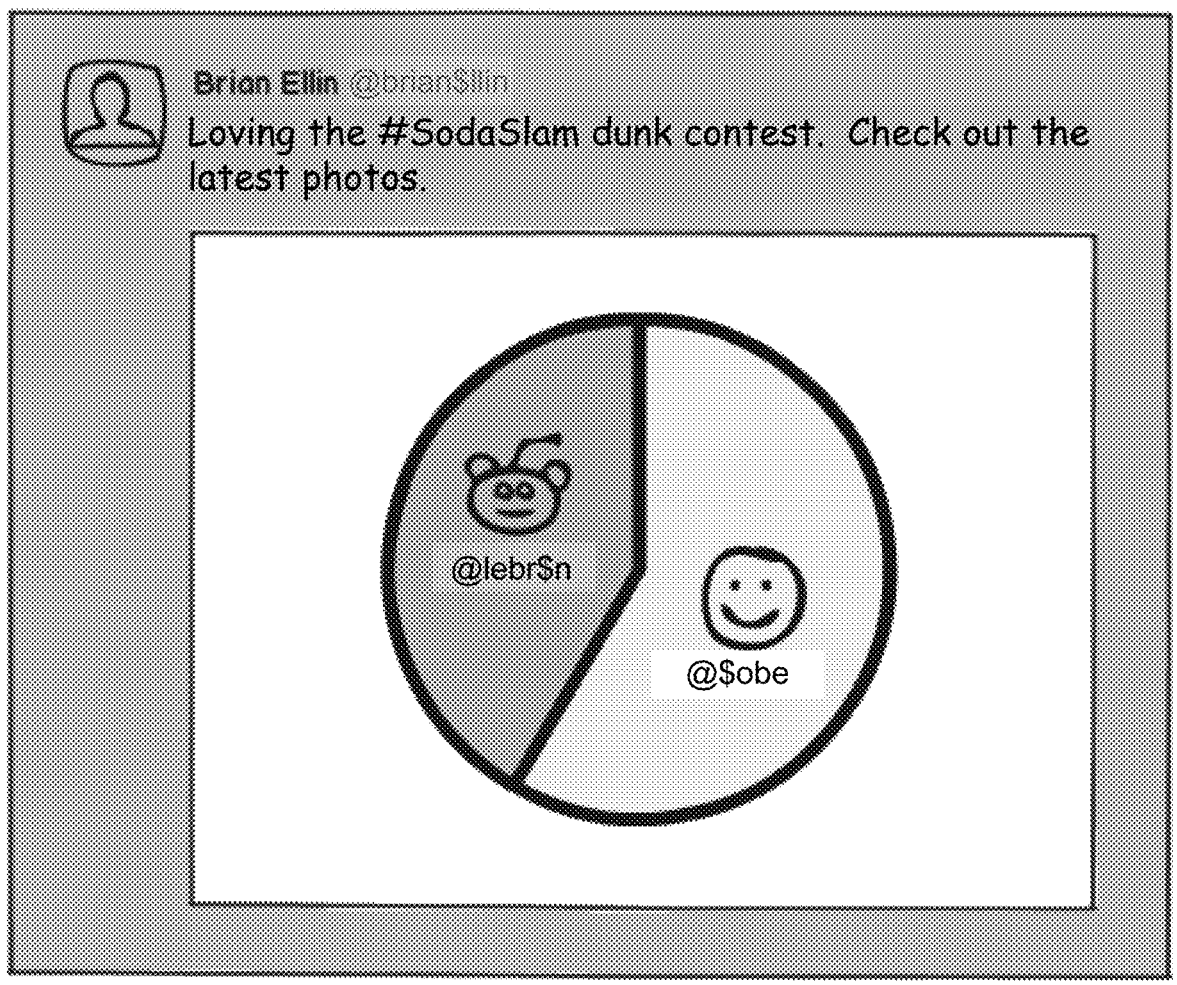
FIGS. 6A-6I are example renderings of in-message applications in accordance with one or more embodiments.

FIGS. 6A-6I show example renderings of in-message applications in accordance with one or more embodiments. FIG. 6A shows an example rendering of an in-message application that tracks the mentions of two different accounts (@lebr$n and @$obe) among messages of a messaging platform. The pie-chart component of this in-message application shows the proportion of mentions of each account in a predefined time period.

Figure 6B:
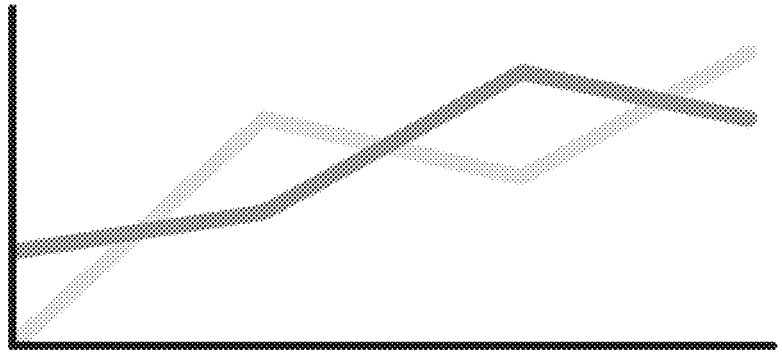

FIG. 6B shows an example rendering of an in-message application that tracks a user's weight and body fat percentage over time. The in-message application is configured to read the weight and body fat percentage from an external data provider that reads values from an Internet-connected health device of the user.

Figure 6C:
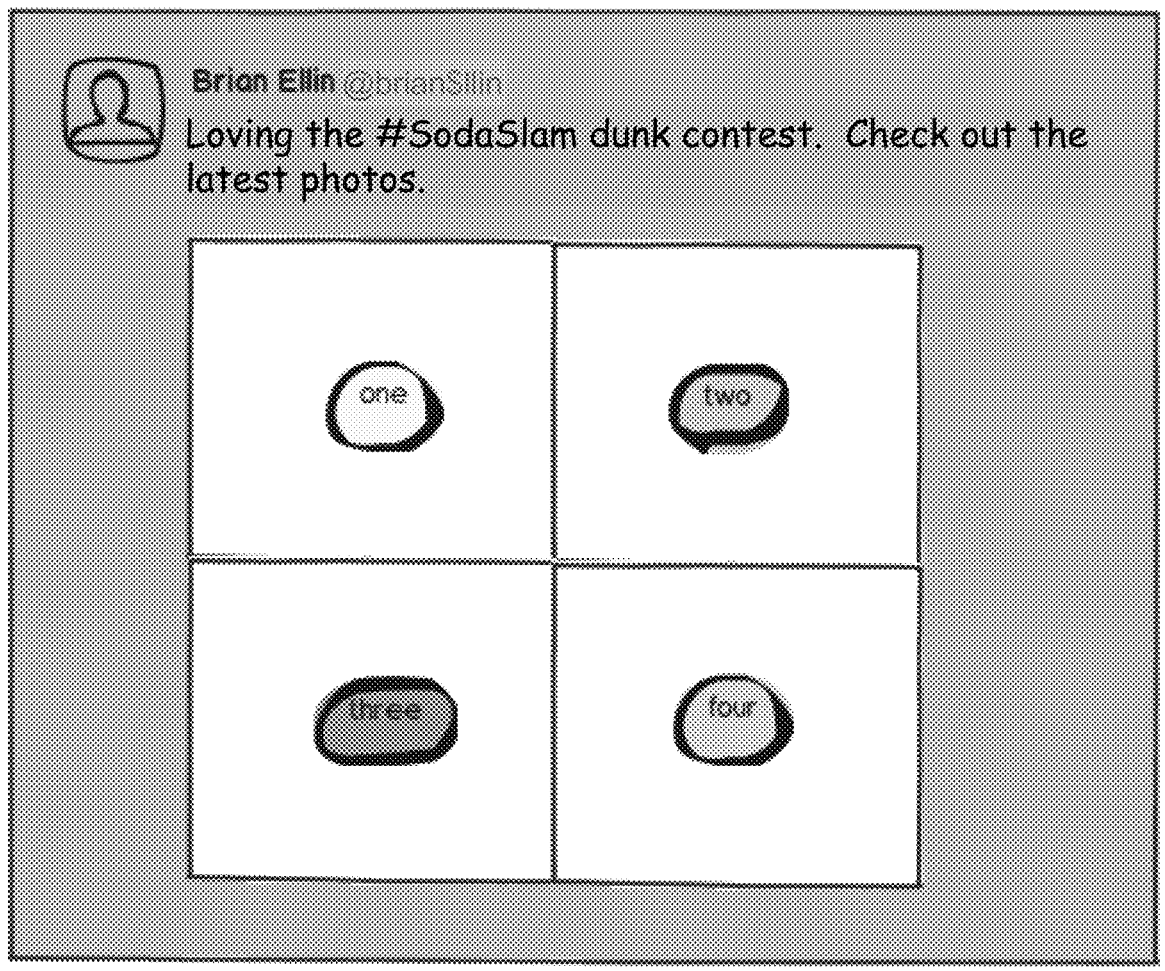

FIG. 6C shows an example rendering of an in-message application that includes a photo grid component.

Figure 6D:

FIG. 6D shows an example rendering of an in-message application that includes a photo slideshow component.

Figure 6E:
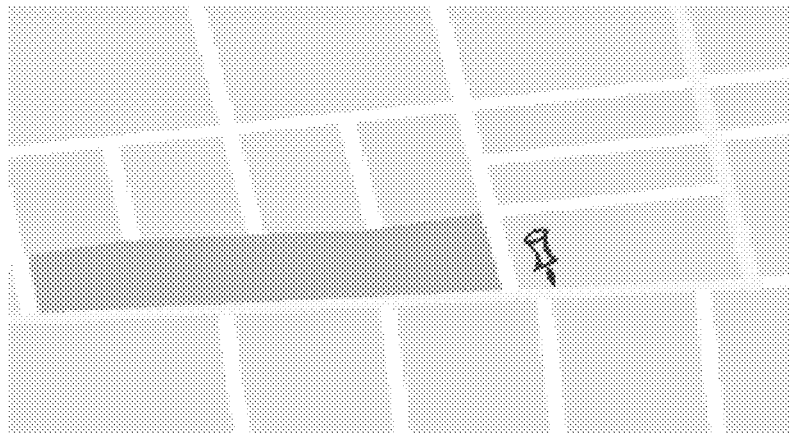

FIG. 6E shows an example rendering of an in-message application that includes a map component. In this example, the messaging platform receives a global positioning system (GPS) coordinate of the user from an external data provider and generates a map depicting a location of the user for display within the map component.

Figure 6F:
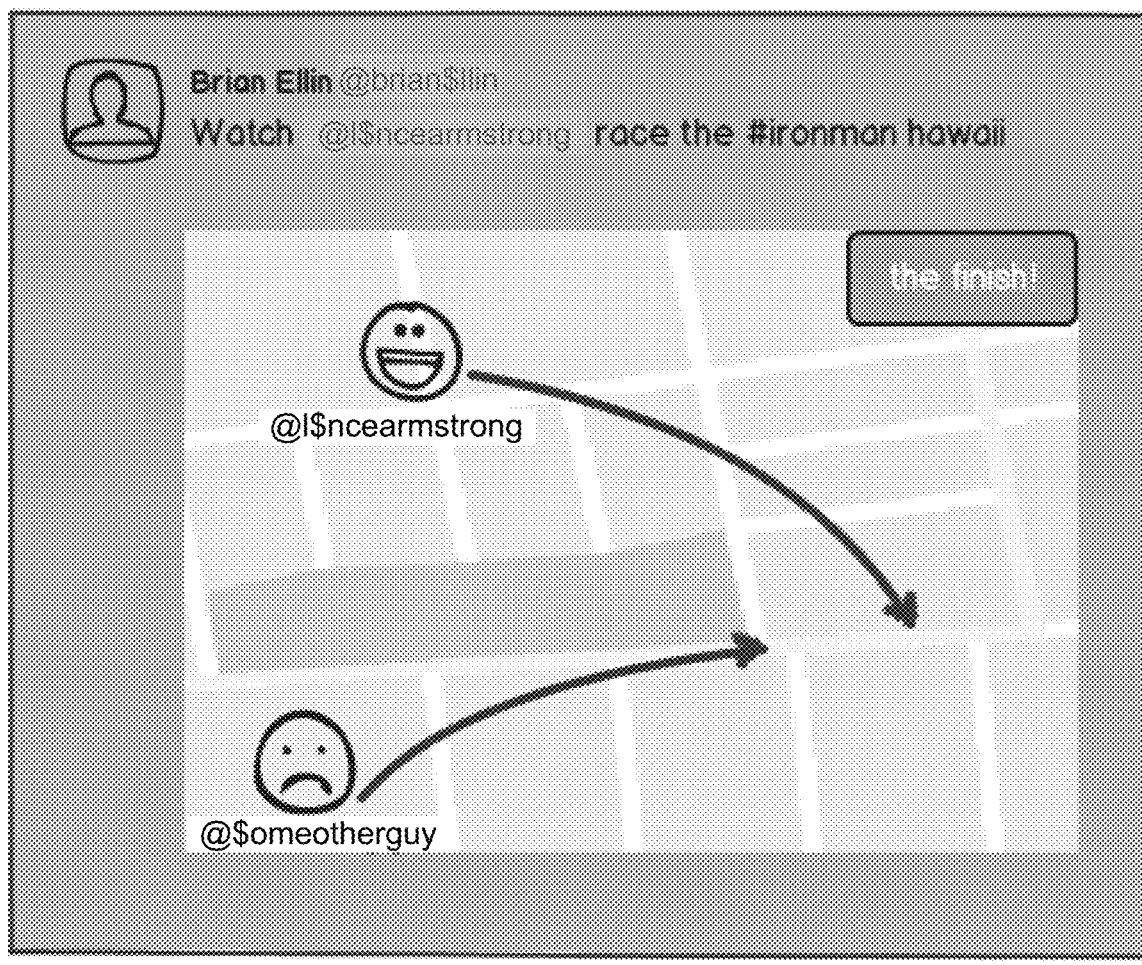

FIG. 6F shows an example rendering of an in-message application that includes a map component. In this example, the messaging platform receives multiple GPS coordinates of different users (in this case, @l$ncearmstrong and @$omeotherguy) directly from each user's mobile device. A map is then generated depicting locations of the users for display within the map component.

Figure 6G:

FIG. 6G shows an example rendering of an in-message application that is configured for audio playback. In this example, the rendering of the in-message application includes options for playing songs from various artists in a playlist of a user of an external music service.

Figure 6H:
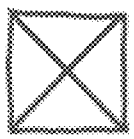
Figure 6H:
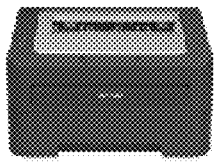

FIG. 6H shows an example rendering of an in-message application that displays an item for sale. The in-message application is configured to fetch content from a listing of the item from an external auction website and to populate a set of components accordingly (i.e., price, title, description, image). The in-message application also includes a "Buy Now" button that, when selected by a user, performs the action of purchasing the item (e.g., through the external auction website).

Figure 6I:

FIG. 6I shows an example rendering of an in-message application that includes a trigger component. In this example, the trigger is configured to calculate a number of rebroadcasts of the message by other accounts of the messaging platform. Upon detecting that the number of rebroadcasts has reached 1,000,000, the rendering of the in-message application is modified to display a movie trailer.

FIG. 7A shows an example set of in-message application tags that can be used to create application metadata. The application metadata can reside within an HTML file and can be created (e.g., by builder 142 of FIG. 1, discussed above) to map content from one or more external data providers to one or more components of an in-message application.

FIG. 7B shows an example of web page metadata (i.e., application metadata) identifying an in-message application. The metadata displayed in FIG. 7B can be stored in an external data provider (e.g., a web server) and can be downloaded by a component of a messaging platform (e.g., application engine 102 of FIG. 1, discussed above) and served to clients for use in rendering of an in-message application.

FIG. 7C shows an example rendering of an in-message application by a web client. The broadcast message in this example is served to the web client with the required content (i.e., article text, image, etc.), which was fetched from an external data provider based on the application metadata defined in FIG. 7B. The web client renders the in-message application according to a visual structure of the in-message application, which, in this example, is stored on a server of the messaging platform (e.g., in application repository 130 of FIG. 1, discussed above).

Figure 7D:
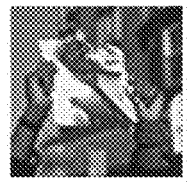
FIG. 7D is an example rendering of an in-message application by a mobile client, in accordance with one or more embodiments.
Figure 7D:
Figure 7D:
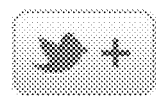
Figure 7D:
Figure 7D:
Figure 7D:
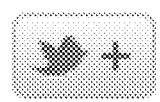

FIG. 7D shows an example rendering of an in-message application by a mobile client. The broadcast message in this example is served to the mobile client with the same required content as the example of FIG. 7C. In this example, the mobile client caches a platform dependent template containing the visual structure in a local storage. The mobile client then receives the broadcast message and renders the in-message application according to the template.

Various embodiments described above may be implemented on virtually any type of computer, regardless of the platform being used.

Figure 8:
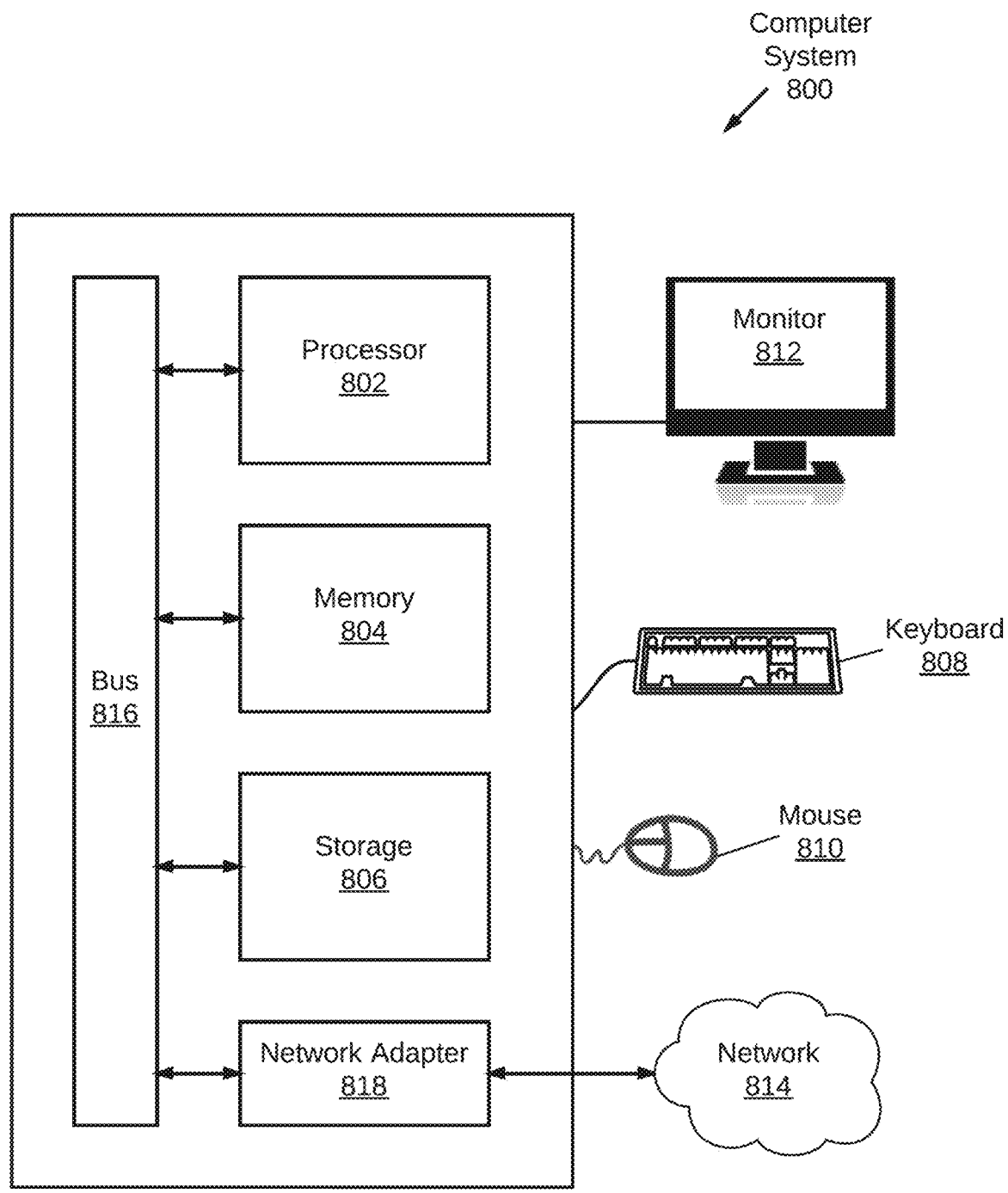
FIG. 8 illustrates a computer system in accordance with one or more embodiments.

FIG. 8 illustrates a computer system in accordance with one or more embodiments. For example, as shown in FIG. 8, a computer system (800) includes one or more processors (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), a network adapter (818), and numerous other elements and functionalities typical of today's computers (not shown). One or more components of computer system 800 may be communicatively connected by a bus (816). Computer system 800 may also include input means, such as a keyboard (808), a mouse (810), or a microphone (not shown). Further, computer system 800 may include output means, such as a monitor (812) (e.g., a liquid crystal display (LCD), a plasma display, or cathode ray tube (CRT) monitor). Computer system 800 may be connected to a network (814) (e.g., a local area network (LAN), a wide area network (WAN), such as the Internet, or any other type of network) via network adapter 818. Those skilled in the art will appreciate that many different types of computer systems exist, and the aforementioned input and output means may take other forms. Generally speaking, computer system 800 includes at least the minimal processing, input, and/or output means necessary to practice embodiments.

Further, in one or more of the above embodiments, one or more elements of the aforementioned computer system (800) may be located at a remote location and connected to the other elements over a network. Further, embodiments may be implemented on a distributed system having a plurality of nodes, where each portion (e.g., application engine 102, frontend module 104, routing module 108, etc. of FIG. 1, discussed above) may be located on a different node within the distributed system. In one embodiment, the node corresponds to a computer system. Alternatively, the node may correspond to a processor with associated physical memory. The node may alternatively correspond to a processor or micro-core of a processor with shared memory and/or resources. Further, software instructions in the form of computer-readable program code to perform embodiments may be stored, temporarily or permanently, on a non-transitory computer-readable storage medium, such as a compact disc (CD), a diskette, a flash memory device, a solid state drive, a primary storage device, or any other tangible computer-readable storage device.

One or more embodiments have one or more of the following advantages. By providing a platform for creating, viewing, and engaging with in-message applications, it may be possible to increase user engagement with messages of a messaging platform. Furthermore, by allowing content providers to use and create in-message applications, it may be possible to increase the quality, relevance, and variety of content shared by the messaging platform.

While various embodiments have been described, those skilled in the art, having benefit of this disclosure, will appreciate that other embodiments can be devised that do not depart from the scope as disclosed herein.

API Card Embodiments—Overview

Various embodiments extend messaging platform 100 to include functionality for retrieving data from and/or submitting data to third party sites. The messages distributed via messaging platform 100 may be referred to as "cards." A card may contain a message between a sender and one or more recipients that references a web resource but may also contain components that facilitate interaction or data from a third party site. In some embodiments, cards are types of in-message applications that include one or more predefined components and/or primitives. In some embodiments, a developer may interact with messaging platform 100 to construct a card that may be used by senders to transmit and collect data from recipients using a third party data repository. For example, a developer may construct a card that can be used to collect votes for a third party server (e.g., to determine a most popular sports team). A sender user can then create an instance of the card with a personal message and disseminate the card to multiple recipient users to collect their votes, which may be transmitted to the third party server for consolidation.

Some embodiments create "card types" to expedite efficient card creation by developers (as well as, in some instances, to provide users with recognizable patterns to card behavior). Each card type may facilitate the reuse of similar functionality and/or organization patterns for different applications. For example, developers for different professional sport leagues or associations may both want to develop cards that can enable users to vote on who is the favorite player. It may be easier for the message platform to define a card type that can be shared between the developers, instead of requiring developers for the different professional sport leagues or associations to develop a new card from scratch. In addition, card types can provide standardized interfaces for handling disparate categories of information.

Figure 9:
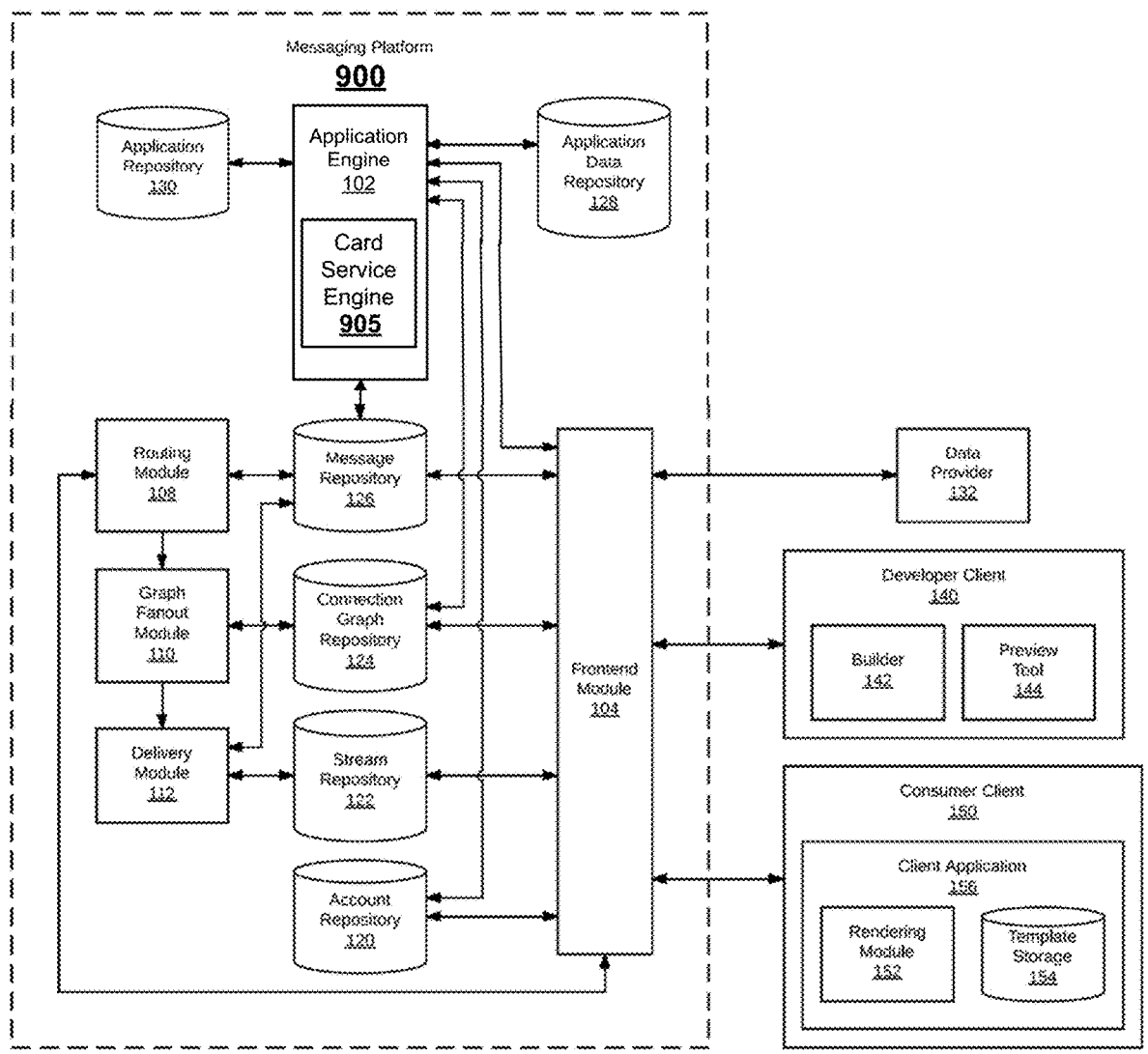
FIG. 9 is a schematic diagram of a system including a card service engine that may be implemented in some embodiments.

FIG. 9 is a schematic diagram of a message platform 900 including a card service engine 905 that may be located in the illustrated manner in some embodiments. In some embodiments, card service engine 905 manages creation of cards by developers, acquisition and transmission of data associated with the cards from third party sources, and receipt and distribution of cards between senders and recipients. One skilled in the art will recognize, however, that these functions may be divided among several components in various embodiments.

Though depicted here alongside components discussed earlier (e.g., routing module 108, message repository 126, etc.) one will recognize that message platform 900 may include fewer or additional components than depicted and may still be able to implement various recited embodiments. For example, in some embodiments, card service engine 905 interacts with components of messaging platform 100, such as application data repository 128, and application repository 130. Card service engine 905 may further interact through frontend module 104 with data provider 132, developer client 140, and consumer client 150. Consumer client 150 may be a sender user or a recipient user as discussed in greater detail herein. In some embodiments, card service engine 905 can also include an application server and storage to store data received from various parties and route data to applications configured to interact with third party servers. The card service engine 905 may be located outside the application engine 102 in some embodiments, inside the application engine 102 (as depicted) in some embodiments, or run as a modification or amendment to software of the application engine 102.

Various components of the system illustrated in FIG. 9 may be located on the same device (e.g., a server, mainframe, desktop personal computer (PC), laptop, personal digital assistant (PDA), telephone, mobile phone, kiosk, etc.) or may be located on separate devices connected by a network (e.g., a local area network (LAN), the Internet, etc.). Those skilled in the art will appreciate that there may be more than one of each separate component running on a device, as well as any combination of these components within a given embodiment of the disclosure.

Figure 10:
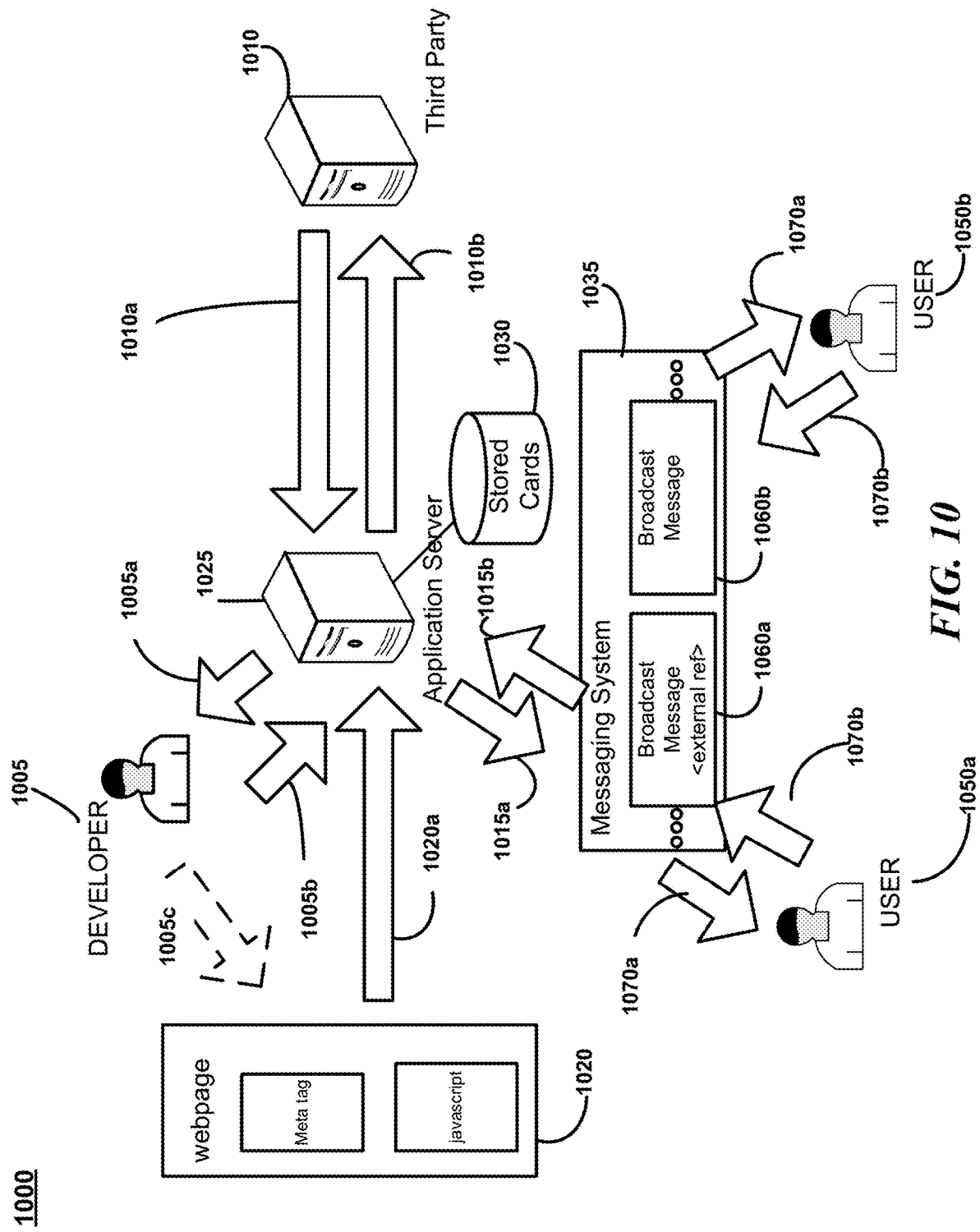
FIG. 10 illustrates an example card application system topology, including users, third parties, developers, and the message platforms, that may be implemented in some embodiments.

FIG. 10 is a block diagram illustrating an example card application system topology 1000, including users, third parties, developers, and message platforms, that may be implemented in some embodiments. In some embodiments, a developer 1005 may communicate with an application server 1025 (e.g., sending commands 1005a and receiving previews 1005b of the generated cards, etc.) to create a card template (e.g., a template as discussed above, but with additional API references and/or functionality as discussed herein). Developer 1005 or another party may also create 1005c a web page 1020. Web page 1020 may be hosted on a server and include various embedded information such as "metatags" and web script, e.g., in the Javascript language. Various metatags may indicate formatting, presentation, and API functionality to associate with portions of the web page used to generate a card. As an example, a developer may create a card template for use when the URL of a newspaper article web page is referenced by a user. The developer of the newspaper article web page may have previously inserted metatags indicating how the article's data is to be used.

Web page 1020 may contain information used to populate portions of a card as specified by developer 1005 and/or in the metatags. Application server 1025 may retrieve 1020a (e.g., via a local area network (LAN), the Internet, etc.) data from web page 1020 to facilitate the construction of a card template. For example, the application server 1025 may identify the metatags in web page 1020 and generate corresponding card components in a card template. Once created, the card template may be stored in a stored cards repository 1030.

A messaging system 1035 may be configured to receive 1070b messages from users 1050a, 1050b, and to retransmit 1070a the messages to other of the users 1050a, 1050b. Messaging system 1035 may be, e.g., the Twitter® messaging system. Some messages 1060b may not include references to external data sources, while other messages 1060a may include such a reference (e.g., a URL to the web page 1020). Messages 1060a including references may precipitate an interaction 1015a, 1015b wherein the message is supplemented with information by application server 1025. For example, messaging system 1035 may forward messages to application server 1025 for substitution with a corresponding card when the reference is identified. Metatags in web page 1020, in conjunction with a card type, may indicate where data is to be transmitted 1010a and/or received 1010b from, e.g., a third party system 1010. Third party system 1010 may be a server that is configured to handle requests and updates from application server 1025.

During the creation of card templates and/or cards, application server 1025 may refer to stored cards (e.g., stored in repository 1030) to identify redundant references to a same web page or requests for recently cached cards. Application server 1025 may dispatch a "crawl" to the web page based on the contents of the stored cards.

API Card Embodiments—Example System Topology

Figure 11:
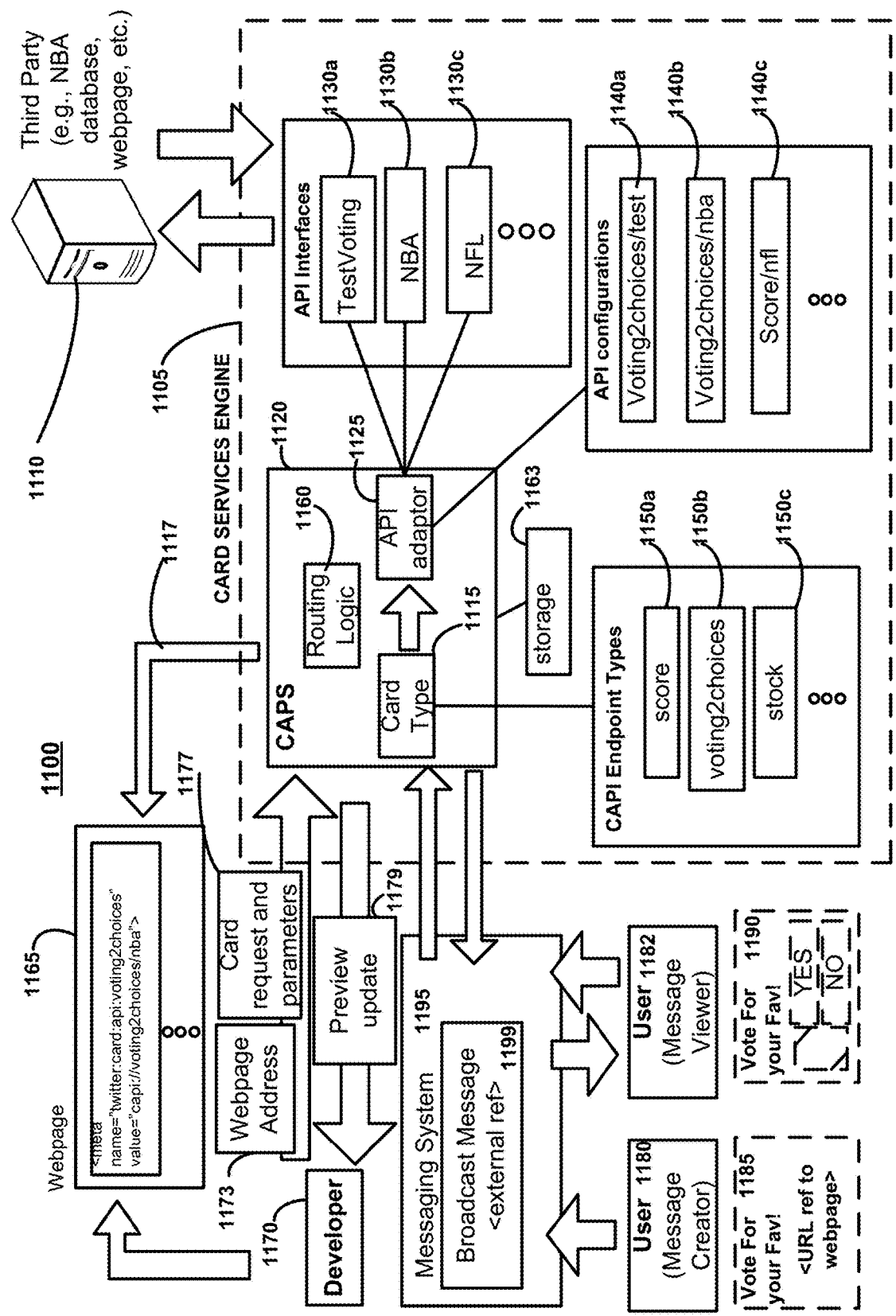
FIG. 11 illustrates various example components interacting with card API proxy services (CAPS) within a card service engine, as may be implemented in some embodiments.

FIG. 11 illustrates various example components 1100 interacting with a card API proxy services (CAPS) system 1120 within a card service engine 1105 that may be implemented in various embodiments. For example, in some embodiments, a developer 1170 submits a web page address 1173 (or other reference, e.g., in some embodiments a copy of the web page itself) and parameters 1177 for creating a card template. The CAPS system may work to generate a card, providing developer 1170 with a preview 1179 of the card (e.g., populating the card template with data from a web page 1165 and/or third-party system 1110 based on the web page's metatags and presenting the results, as would be seen by a user, to the developer). CAPS system 1120 may retrieve data from web page 1165 using, e.g., CURL requests as described herein. CURL is a utility that enables exchange of data using various protocols. After developer 1170 is finished creating the card, the card may be stored in storage 1163. The card template may be initially generated from one of a plurality of card types 1115. Developer 1170 may then customize the card template to suit his particular objectives.

CAPS system 1120 may identify API functionality (referred to herein as CAPI) based upon the developer's specification using routing logic 1160 and type 1115 of the selected card. Routing logic 1160 may specify which API function corresponds to which desired operation specified in the template (e.g., voting). For example, a plurality of external API interfaces 1130a, 1130b, and 1130c may each provide functionality to send/receive data from third party system 1110. For example, the API interfaces 1130a, 1130b, and 1130c may be used by the card services engine 1105 to communicate with various third-party resources operating on third-party system 1110. In some embodiments, the API interfaces 1130a, 1130b, and 1130c may instead be substituted with a generic API adaptor (e.g., where a common "generic" protocol is provided to the third-parties for use when communicating with the card services engine 1105). Configurations 1140a, 1140b, and 1140c may be specified by the developer 1170 or a third party, regarding how the API is to be used for a given input. Card types 1115 may specify one or more endpoints 1150a, 1150b, and 1150c by which to collect information via APIs. Thus, in some embodiments a developer may only have knowledge of the endpoints 1150a, 1150b, and 1150c associated with various functions, thus providing a layer of abstraction between card template creation and the operations of third party systems. CAPS system 1120 can use a CAPI endpoint to route requests to different external API endpoints, e.g., APIs for NBA® 1130b or NFL® 1130c servers. Should the interface or "contract" between the developer and CAPS change, the modification may be presented to developer 1170 as a new CAPI endpoint type.

After cards are created, a user 1180 (message creator) may create a message 1199 including a reference to web page 1165 and may send message 1199 to messaging system 1195. The message may appear as indicated in screen 1185 to user 1180. Messaging system 1195 can recognize the external reference and request a suitable card depiction instance from a card services engine system 1105. Card services engine system 1105 may create a card instance from the corresponding card template or may retrieve a previously created instance from storage 1163 and broadcast the instance to recipient users 1182 (which may include creating user 1180). Received message 1190 may include additional material in the card format (e.g., voting buttons, graphs, videos, other results from the third party server, etc.). One will recognize that "broadcasting" may take many forms. For example, card instances may be returned when recipient users 1182 visit a service or web page rather than be pushed to devices of recipient users 1182.

API Card Embodiments—Example System Components

Figure 12:
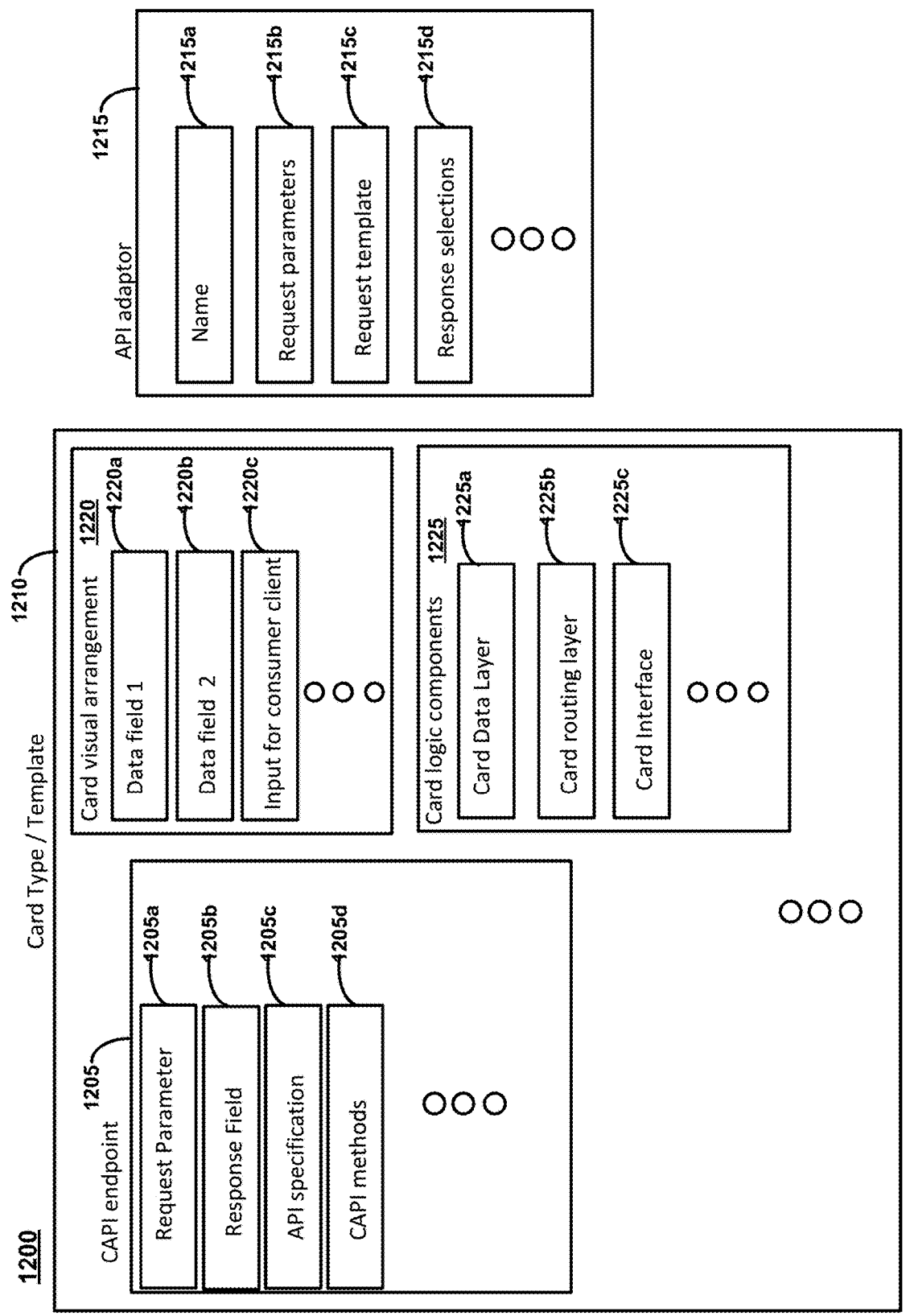
FIG. 12 illustrates details of the various example components of a CAPS within a card service engine, as may be implemented in some embodiments.

FIG. 12 illustrates details of the various example components of a 1200 CAPS within a card service engine that may be implemented in some embodiments. In some embodiments, a card type 1210 contains or references one or more CAPI endpoints 1205. Card type 1210 may also have a card visual arrangement 1220 (e.g., an HTML and/or cascading style sheet (CSS) file indicating how components are to be arranged in the user's view), and the card type's operations may be defined by card logic components 1225. Thus, a card type is itself a card template in some embodiments. The card type may be defined by the messaging platform or may be defined by a developer or a user (e.g., developers may share card type templates). Card types may include consumer related card types such as a "player" card type, a "product" card type, "sport" cards, "news" cards, "voting" cards, and so on. In general, a card type defines the presentation format of the message, enables integration of third party data, accepts users' inputs, and processes data based on an application logic. The particular application of the data from a web page may then be decided by the developer.

For example, in some embodiments, card type 1210 includes a template, which is card visual arrangement 1220. Card visual arrangement 1220 can define the components of the card and its layout. For example, a card can have a data field 1220a and another data field 1220b (e.g., "form" inputs in an HTML document). The data field may be an image at the top of the card. The data field may have a body text or a title text. The data field can have an input field 1220c for a user to provide inputs. For example, the input field can be a button that a user can click to increment a counter (e.g., a counter on a third party server).

For example, in some embodiments, card type 1210 also includes card logic components such as a card data layer 1225a, a card routing layer 1225b, and a card interface 1225c. In some embodiments, the message is a user interface to the card. The card data layer allows access to card instance data, while the card routing layer maps user input data to external APIs.

CAPI endpoint type 1205 can be a "contract" between the Clients and CAPS. CAPI endpoint type 1205 can be stored and accessed in "thrift" structures in storage in some embodiments. Thrift is a standard Internet interface definition language for exchanging data. CAPI endpoint type 1205 may reflect all the metadata information retrieved from a web page. The endpoint may be primarily designed to be a mapping of data from a third party API to a particular input in the card. In some embodiments, CAPS will implement generic logic to parse/validate the requests and compose the response based on the specification. CAPI endpoint types and API adaptor configurations can also be used to drive a generic machinery to achieve the needed processing/logic. Using CAPI endpoint types can keep the code base relatively stable and avoid frequent service redeployments and disruption.

For example, in some embodiments, CAPI endpoint type 1205 can contain a request parameter 1205a, a response field 1205b, an API specification 1205c, and CAPI methods 1205d. In more detail, a CAPI endpoint type can be defined as a compilation of thrift structures as follows:

```
struct RequestParameter {
    1: string name
}
struct ResponseField {
    1: string name
    2: ResponseFieldType ftype
}
struct ApiSpec {
    1: optional list<RequestParameter> requestParams
    2: optional list<ResponseField> responseFields
}
struct CapiEnpointType {
    1: string name
    2: optional ApiSpec getApi
    3: optional ApiSpec postApi
    4: optional ApiSpec delApi
    5: optional ApiSpec putApi
}
```

Each CAPI endpoint type can optionally support GET, POST, DELETE, and PUT methods, each of which specifies the request parameters and the response format. The requestParams method specifies what HTTP request parameters can be used in composing outgoing requests. The responseFields method specifies what values extracted by adaptors are sent to the clients and how to convert them into the data formats that the clients understand.

In some embodiments, external API endpoints and the adaptor and its configurations are visible to neither the users nor the card developers. CAPS makes the appropriate requests to the external API endpoints and parses the responses via an API adaptor 1215, which bridges CAPI endpoints and external endpoints. Adaptor configurations can be keyed by the CAPI endpoint, so that there is a one-to-one relationship between CAPI endpoints and adaptor configurations.

For example, in some embodiments, API adaptor 1215 contains a name 1215a, a list of request parameters 1215b, a request template 1215c, and a response selection field 1215d. More details are shown by the following example.

An example of an external API adaptor specification is defined in the following thrift structure:
    struct ExternalApiAdapter {
        1: optional string url
        2: optional list<Selection> requestParams
        3: optional string requestBodyTemplate
        4: optional map<string, string> requestSecrets
        5: optional list<Selection> responseSelection
    }

Figure 13:
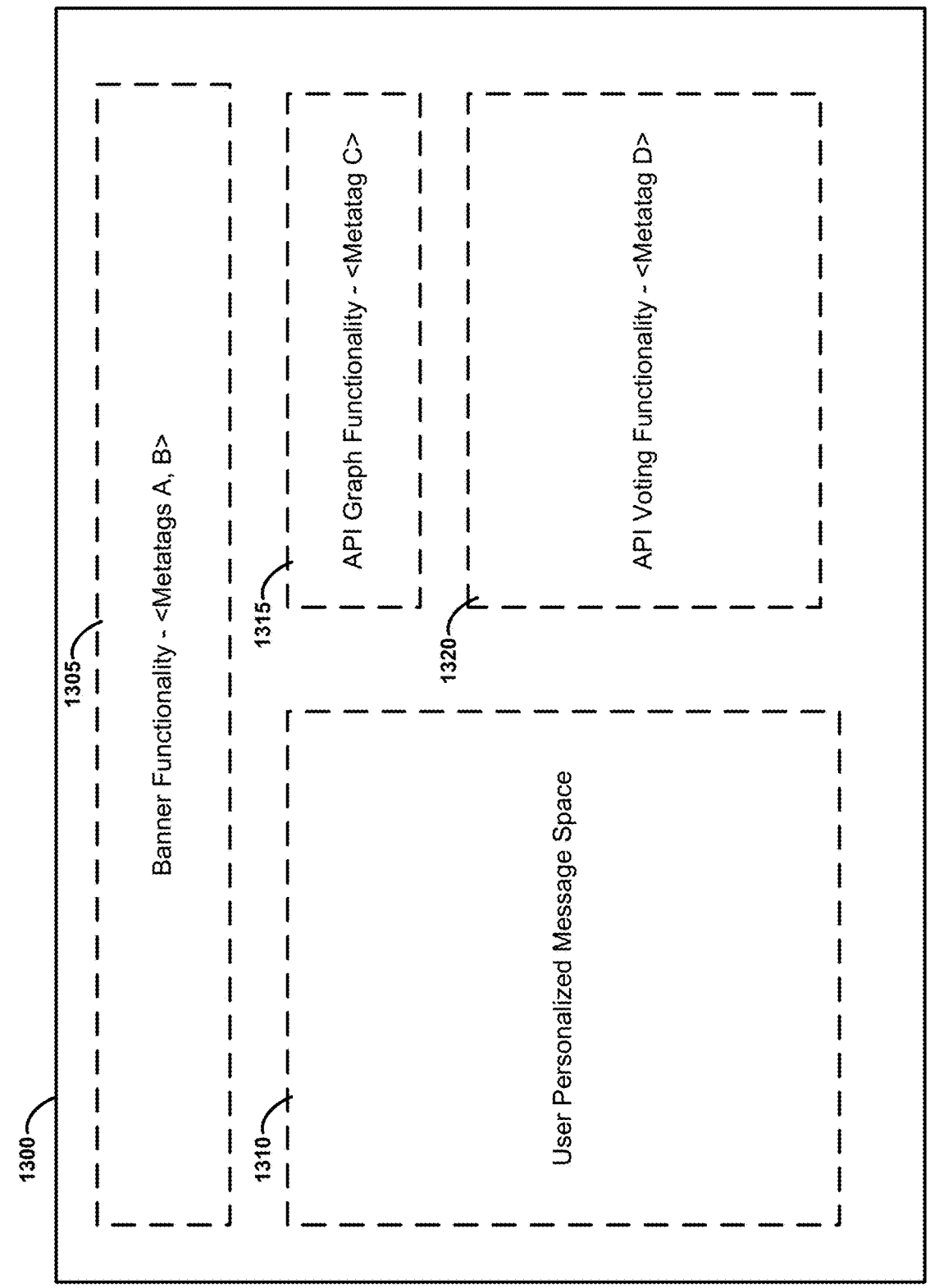
FIG. 13 illustrates a visualization of an example card type template, as may be implemented in some embodiments.

FIG. 13 illustrates a visualization of an example card type template 1300 as may be implemented in some embodiments. In this example, a region 1310 is reserved for the personal message written by the message creating user. A banner region 1305 may include images and text derived from the web page as specified by metatags A and B in the web page. The web page may similarly contain metatags identifying API functionality. In this example, a metatag C may be used to populate a region 1315 to reflect the results of an ongoing vote (e.g., as a graph derived from a third party server). For example, the endpoint association with region 1315 may be associated with API functionality that queries a third party server for the current voting statistics. The metatag may indicate, e.g., which third party server to contact. Similarly, region 1320 may serve as a user interface element and provide input functionality by which a user may vote. A metatag D in the web page may specify what voting tools are to be provided, which third party server they are to interact with, etc. Some of the API functionality may allow for dynamic updates, pushing data to user devices from the third party server over time (e.g., to reflect voting result changes in region 1315). A developer may rearrange these elements and substitute additional regions as part of the customization process.

API Card Embodiments—Example Developer Card Creation Process

Figure 14:
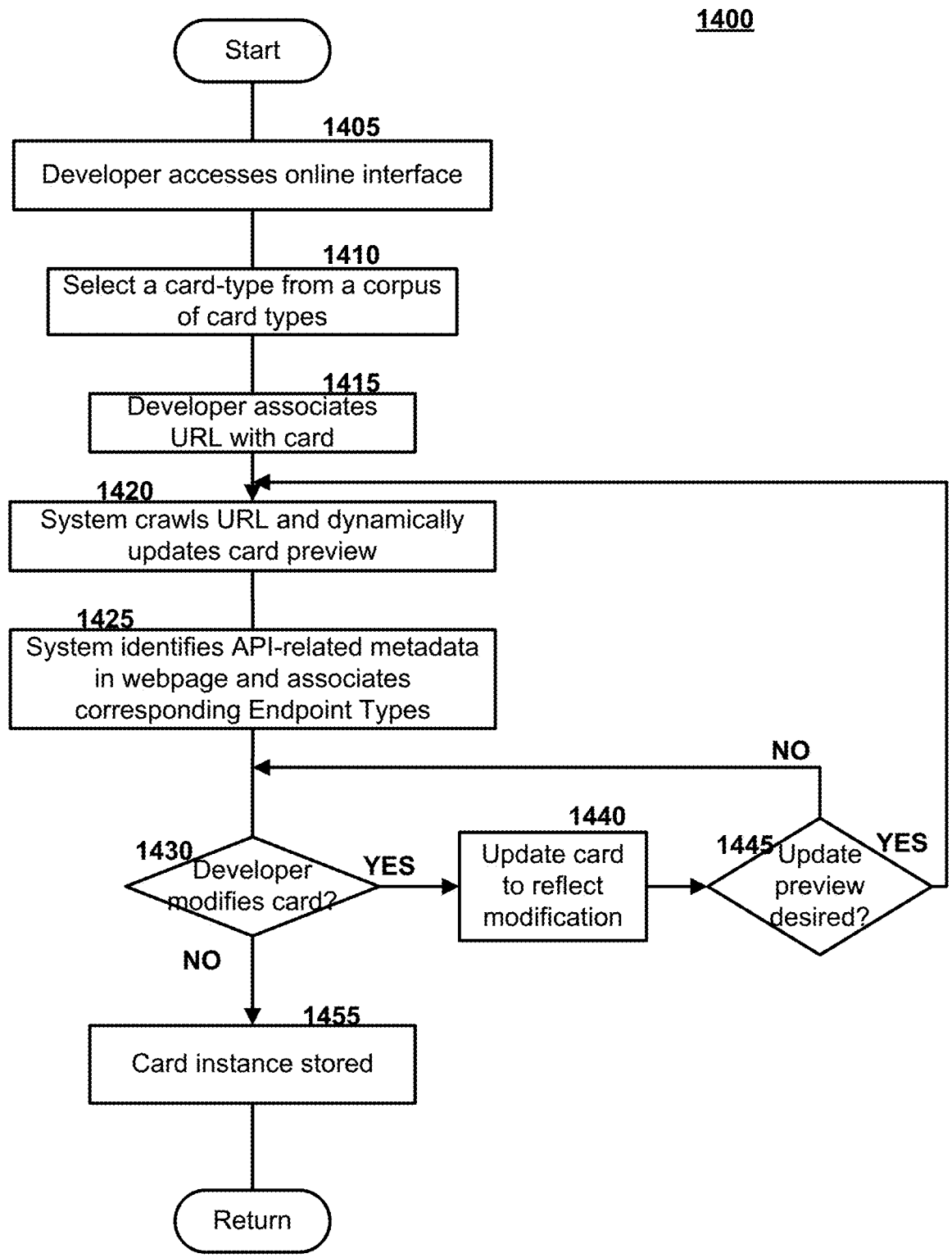
FIG. 14 illustrates an example flowchart of a developer's actions, as may be implemented in some embodiments.

FIG. 14 illustrates an example flowchart 1400 of a developer's actions during card template customizations as may be implemented in some embodiments. For example, in some embodiments, a developer may wish to develop a card for a user for use during television programming, such as a sports game or audience participation television show. The developer want to create a voting card representing the voting options so that the audience can vote, e.g., between one or more contestants or players.

At block 1405 a developer may access a developer interface (e.g., a web portal) in communication with the card services system. The web portal may store different card types for use by the developer. The interface may enable a developer to define the mapping between data in a website (e.g., as indicated with metatags) and an API provided by a third party.

At block 1410, the developer may select a card type from a corpus of card types (e.g., based upon the developer's design needs). The corpus of card types can include many card types such as a news card type, a consumer card type, a voting card type, etc. For example, in some embodiments, in order to create a voting card, the developer selects the voting card type. The developer may further create a voting card endpoint, which invokes the voting API provided by a third party. In some embodiments, the developer can define all the endpoints that he wants to use.

At block 1415, the developer may indicate one or more web pages to associate with the card (in some embodiments, the developer may also insert metatags into the web page specifying how content is to be extracted and APIs applied). At block 1420, the system may retrieve the content of the web page specified by the URL (e.g., using a CURL command) and update a preview of the card to the developer.

At block 1425, the system may identify API-related metadata in the web page (e.g., based upon the metatags) and associated corresponding endpoint types. At decision block 1430, the developer may continue to modify the card (e.g., adding and removing regions in the template, modifying display parameters, etc.). The developer may change the arrangement of elements, may select a different card type, may update the web page and request that a refresh be performed, etc.

At block 1440, the card template may be updated to reflect the modification (note that the original card type template may be preserved for use by other developers). If the update warrants an adjustment to the preview (e.g., where the arrangement of elements or data from the website has changed) at decision block 1445, the system may retrieve the website again at block 1420. Once the user is finished editing the card template, the card template may be stored at block 1455.

The process 1400 may be run several times and not only at the time of the card's initial creation. For example, a developer can generate a soft drink brand card, and then a user can deploy the card through 100 tweets using the generated card instance. Afterwards, the developer may find out that the spelling of soft drink brand is wrong. The developer can correct that instance of the card template, and then it will appear in the updated form for all the users who received the card message. The new card instance with the correct spelling may be generated when the new message is sent subsequently, and the new card instance may be stored for future retrievals until the developer makes a new update.

API Card Embodiments—Example User Card Message Creation Process

Figure 15:
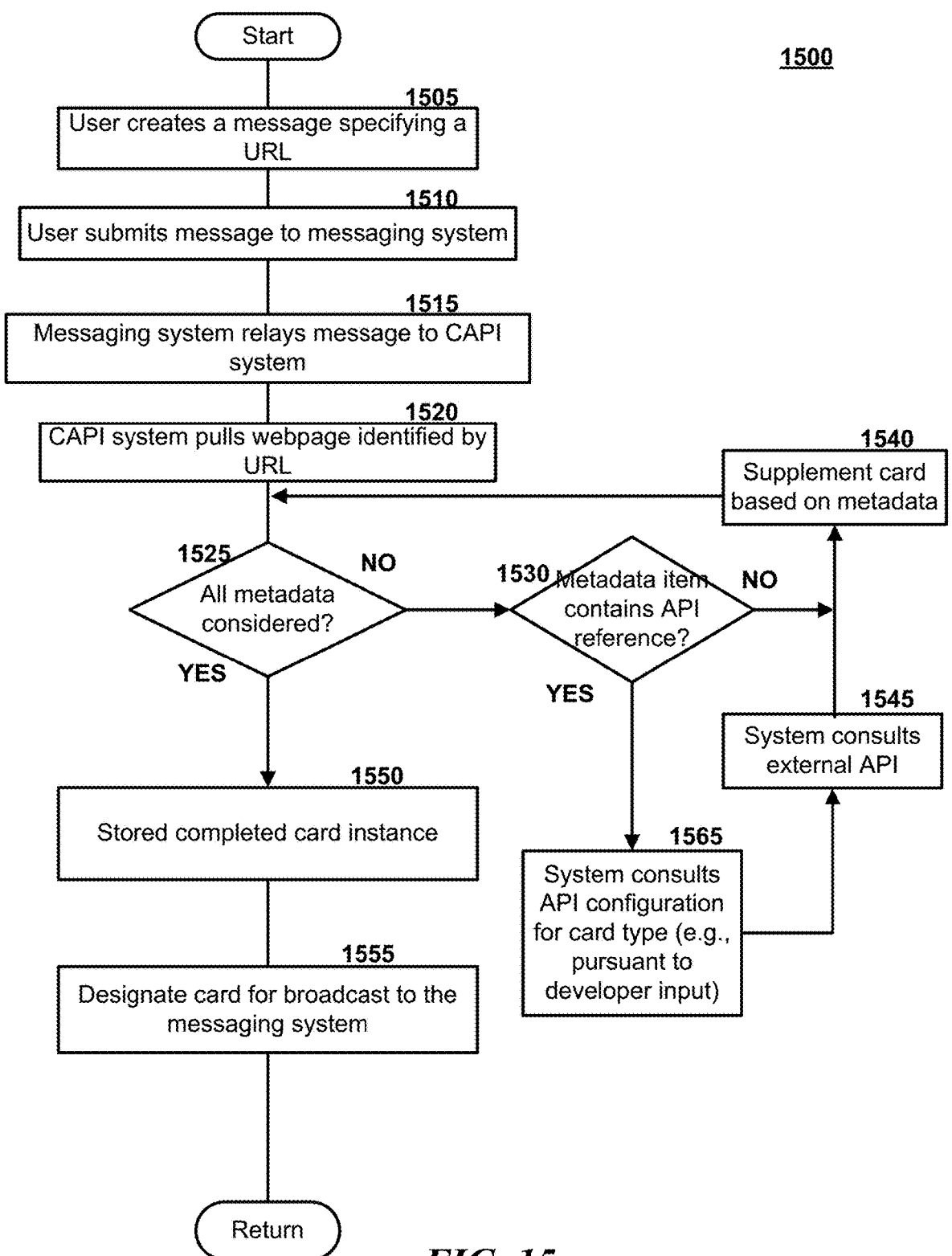
FIG. 15 illustrates an example flowchart of actions performed by a user who creates a message, as may be implemented in some embodiments.

FIG. 15 illustrates an example flowchart 1500 of actions performed by a user who creates a message that may be implemented in some embodiments. At block 1505, a user may create a message including a URL to a web page. For example, the user may be commenting to the user's associates regarding a poll on a newspaper's web page. The message may be created using a messaging platform. For example, in some embodiments, a user may go to a messaging system's web page and paste in a URL of a newspaper article web page. The newspaper article web page may be used to populate the card template with data and to identify relevant APIs based upon metatags in the newspaper article web page.

At block 1510, the user submits the message to the messaging system. At block 1515, the messaging system may receive the message, recognize that it contains a reference, and relay all or a portion of the message to the CAPI system for retrieval and/or population of the appropriate card. For example, in some embodiments, once the user generates the message containing the URL to the web page of the newspaper article, the messaging system (e.g., twitter.com) checks a CAPI system server to determine whether the article web page has been previously sent and whether a card instance has been generated and stored in CAPI system.

At block 1520, the CAPI system may retrieve the web page identified by the reference (or retrieve a cached copy, e.g., if the web page was previously retrieved). If an instance of the card was recently created, at block 1520 the system may in some embodiments retrieve a cached copy of all or a portion of the card instead. For example, another user may have recently referenced the website and generated the user's own instance of the card (e.g., only the region with the user's own accompanying personal message need be repopulated).

At block 1525, the system may determine whether all metadata has been considered from the web page. If metadata remains unconsidered, at block 1530 the system may determine whether the metadata includes tags identifying APIs to be used with the card (e.g., a voting API). If so, at block 1565, the system may consult the API configuration for card type (e.g., based on the endpoint) to identify the corresponding API functionality. The system may consult the external API at block 1545 to perform the desired functionality. After the system has consulted the external API, the system may update the card based upon the identified metadata at block 1540. Once all the metadata is considered, the system may store the completed card instance at block 1550. The system may then designate the card for broadcast to the messaging system at block 1555. The messaging system can then broadcast the message as a card instance to other users for viewing and/or interaction.

API Card Embodiments—Example User Card Message Viewing Process

Figure 16:
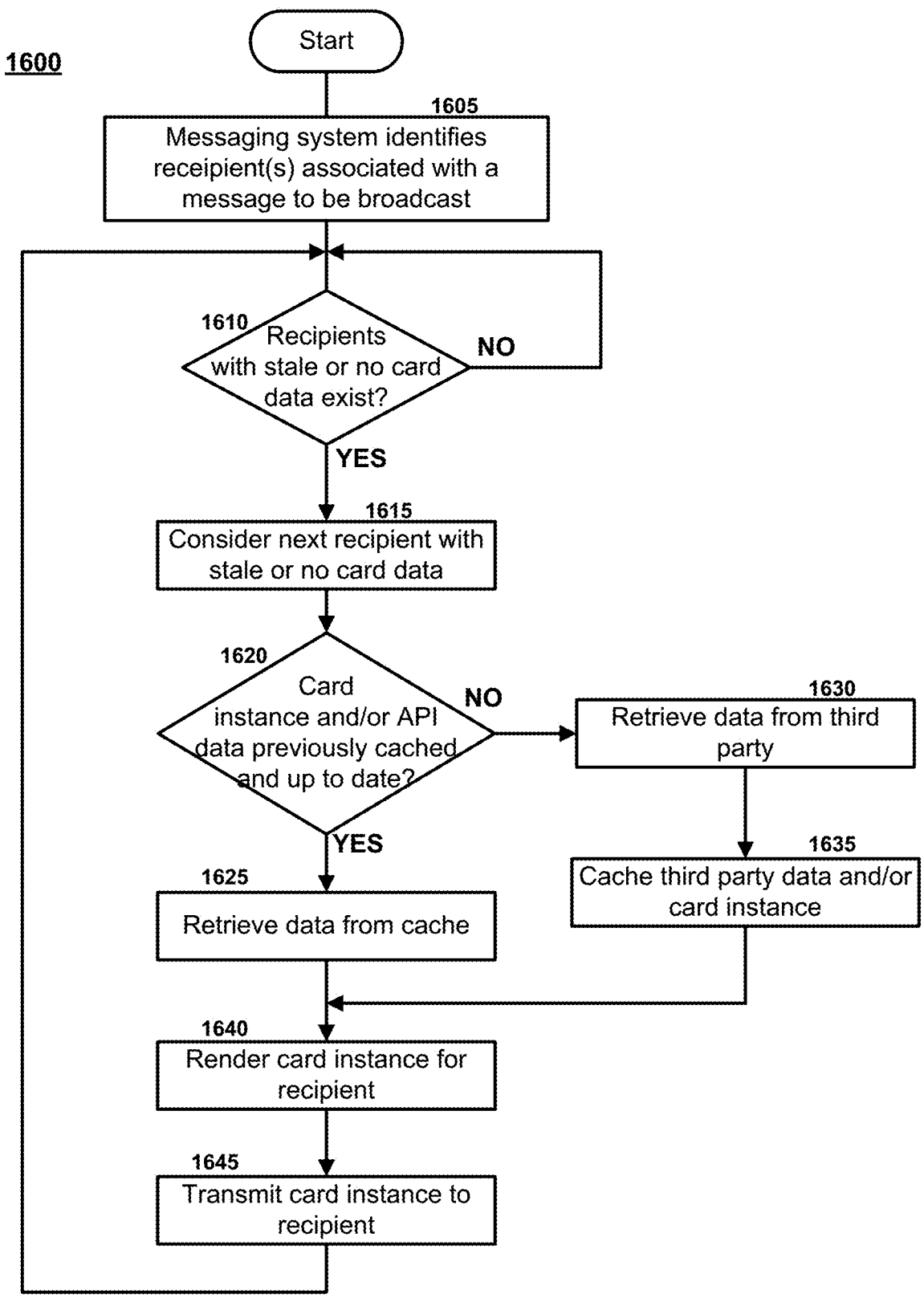
FIG. 16 illustrates an example flowchart of actions performed by a message platform to provide messages to viewers, as may be implemented in some embodiments.

FIG. 16 illustrates an example flowchart of actions performed by a message platform to provide messages to viewers that may be implemented in some embodiments. At block 1605, the messaging system may identify recipient users associated with a message to be broadcast (e.g., the recipient user may have visited the message creator's message feed via a browser). If recipients remain to be considered at decision block 1610, the system may consider the next recipient at block 1615. Remaining recipients may be identified, e.g., when a user receives a message via the messaging service. At decision block 1620, the system may check to see whether a card instance or API data has been previously cached and is up to date. If so, at block 1625, the system may retrieve the data from the cache. Conversely, if the API data or the card is stale, then the system may retrieve data from a third party system at block 1630 and cache the third party data at block 1635.

At block 1640, the system may render the card instance to the recipient. At block 1645, the system may transmit the card instance to the recipient. The process may continue until no recipients remain. However, one will recognize that where the system passively provides cards upon request, the process may be performed again for subsequent requests (e.g., new recipients).

API Card Embodiments—Example User Card Message Response Process

Figure 17:
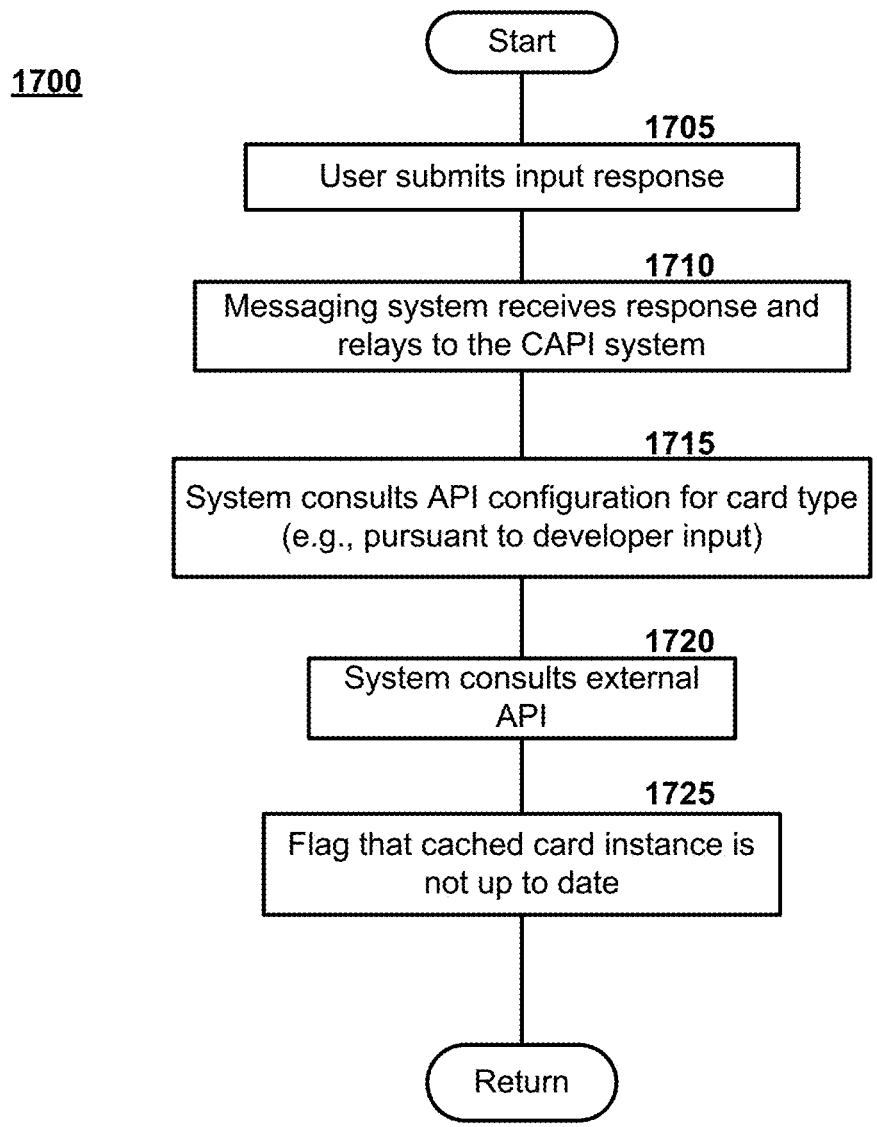
FIG. 17 illustrates an example flowchart of actions performed by a message platform after receiving responses from users, as may be implemented in some embodiments.

FIG. 17 illustrates an example flowchart 1700 of actions performed by a message platform after receiving responses from a user that may be implemented in some embodiments. The message platform sends the card and data to the user and then accepts inputs from the user.

At block 1705, a user submits an input response after receiving a message. For example, in some embodiments, the input response is submitted by interacting with a component displayed in the card message. At block 1710, the messaging system may receive the response and relay the information to the CAPI system. At block 1715, the CAPI system may consult the API configuration for the card type, e.g., to determine where the data should be routed to and in what format. These parameters may be specified by the third party in some instances.

At block 1720, the system consults the external API to route the data to the third party destination. If the feedback results in an update to the card, the updated card instance will be pushed to the user. In some embodiments, at block 1725, the system may flag that the cached card instance is not up to date (resulting in a new retrieval at block 1620).

API Card Embodiments—Example Caching Optimization

Figure 18:
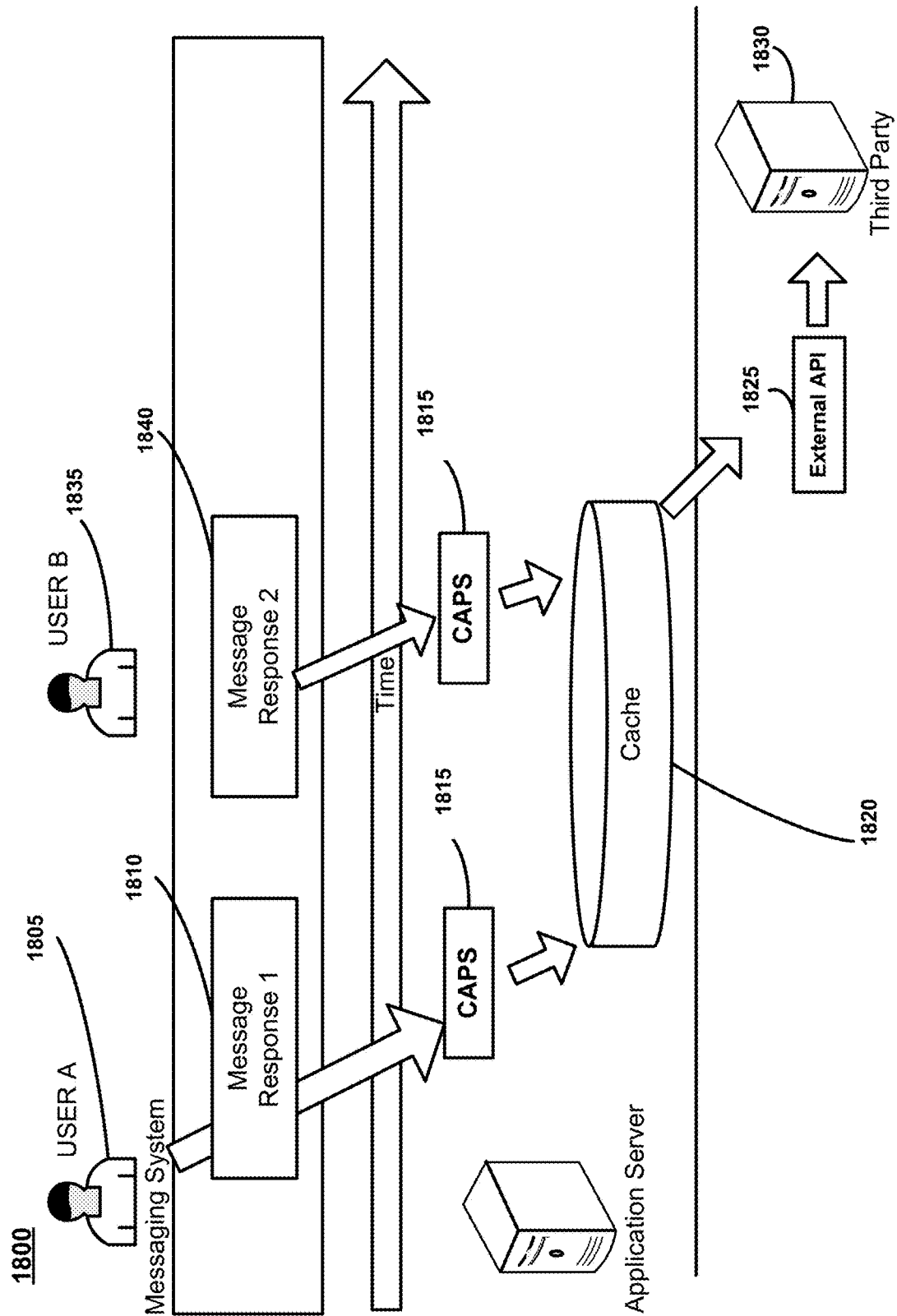
FIG. 18 illustrates an example message platform configured to interact with users, as may be implemented in some embodiments.

FIG. 18 illustrates an example message platform 1800 configured to interact with two users, that may be implemented in some embodiments. The message platform manages the interactions among different users who may provide data to the card. There may be a shared storage area in the message platform associated with the card. A user A 1805 and a user B 1835 may both respond to a message by providing data or input to the system. The input 1810 from user A 1805 may be first received by CAPS 1815, and stored in a cache 1820. The input may not immediately result in a transfer to the external API, so that communications with the third party server may be consolidated.

Accordingly, a subsequent input 1840 from user B 1835 is received by CAPS 1815 and is also stored in the same cache 1820. When cache 1820 reaches an expected number of stored messages, when the API configuration parameters dictate an update, and/or when network conditions facilitate a transfer, all the cache data may be purged to an external API 1825 and consequently a third party system 1830.

This caching may be useful when there are many users who may provide input at the same time. The data provided by such large numbers of users may be lost before it reaches the external API for processing if the data is not saved in the messaging platform. The data from multiple users can be written into the cache so that the data can be saved and retrieved by the external API for processing when suitable.

API Card Embodiments—Example System API Operations

Figure 19:
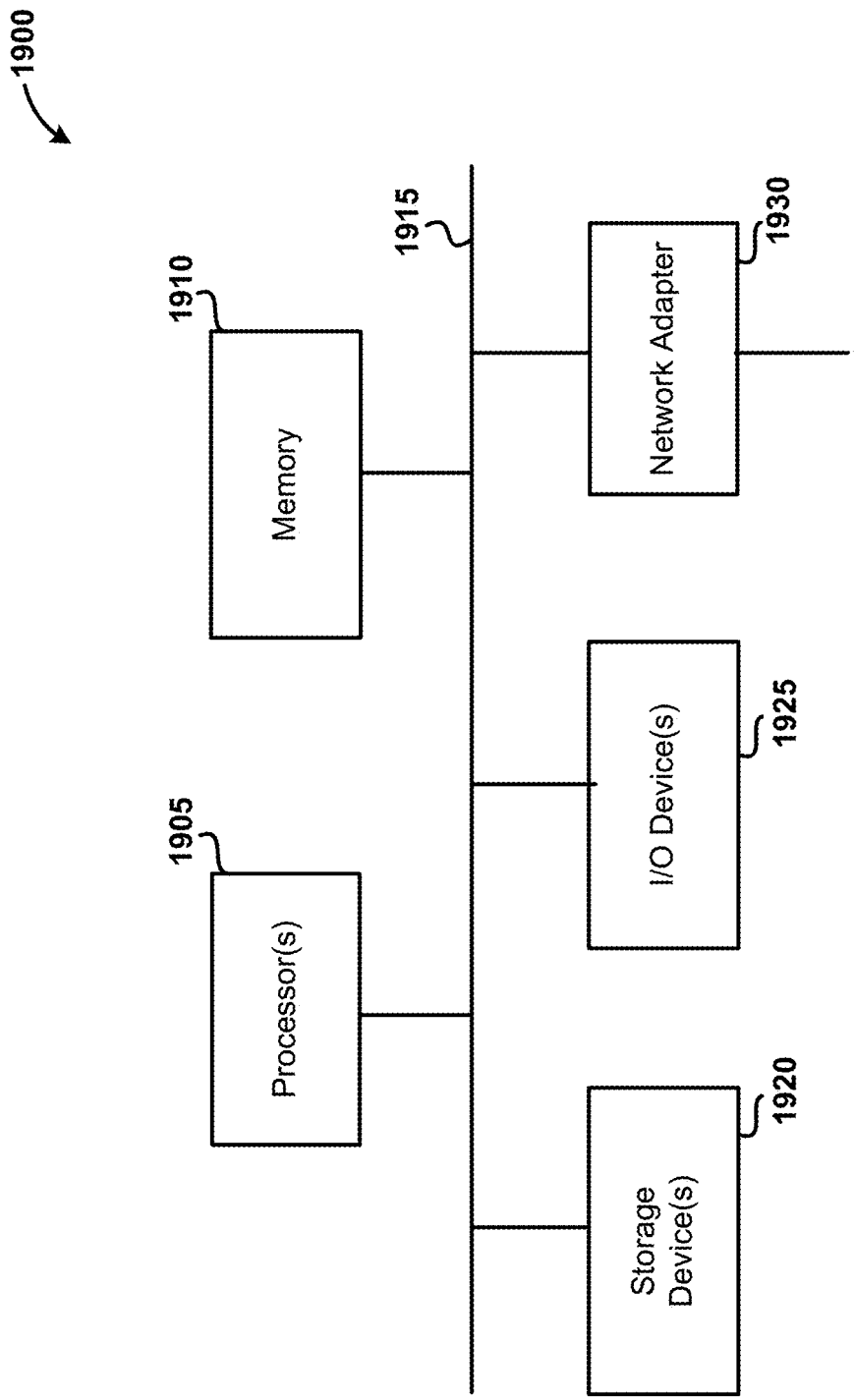
FIG. 19 illustrates a computer system configured to perform the functions described herein, as may be implemented in some embodiments.

FIG. 19 illustrates a computing system that can be used to implement various described embodiments. The computing system 1900 may include one or more central processing units ("processors") 1905, memory 1910, input/output devices 1925 (e.g., keyboard and pointing devices, display devices), storage devices 1920 (e.g., disk drives), and network adapters 1930 (e.g., network interfaces) that are connected to an interconnect 1915. The interconnect 1915 is illustrated as an abstraction that represents any one or more separate physical buses, point-to-point connections, or both connected by appropriate bridges, adapters, or controllers. The interconnect 1915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

Memory 1910 and storage devices 1920 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer-readable media can include computer-readable storage media (e.g., "non-transitory" media) and computer-readable transmission media.

The instructions stored in memory 1910 can be implemented as software and/or firmware to program the processor(s) 1905 to carry out the actions described above. In some embodiments, such software or firmware may be initially provided to computing system 1900 by downloading it from a remote system through computing system 1900 (e.g., via network adapter 1930).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, and no special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given above. Note that titles or subtitles may be used in the examples for the convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including its definitions, will control.

What is claimed is:

1. A system comprising:
   multiple client computing devices each storing one or more application identifiers, templates, and client software, wherein the templates each define respective visual structures for in-message applications, and wherein the client software stored on each client computing device is operable, when executed by the client computing device, to receive a message that contains message content and a reference identifying a location of external data, and to render on the client computing device an in-message application specified by an application identifier in the external data, external content in the external data, the message content, and one or more mappings according to the visual structure defined by a respective template for the in-message application specified by the application identifier; and
   one or more server computers and one or more storage devices, wherein the one or more storage devices store instructions that are operable, when executed by the one or more server computers, to cause the one or more server computers that implement a real time messaging platform to perform operations comprising:
      receiving, a first message that contains first message content and a first reference identifying a location of first external data, wherein the location is a location on an external data provider and the first external data is accessible through the first reference;
      obtaining, through the first reference, the first external data, wherein the first external data includes (i) a first application identifier that identifies a first in-message application that has a user interface (UI) component, (ii) first external content, and (iii) one or more first mappings of elements of the first external content to the UI component;
      generating a second message that includes the first message content, the first application identifier, the first external content, and the one or more first mappings; and
      broadcasting the second message to respective client software of one or more client computing devices of the multiple client computing devices.

2. The system of claim 1, wherein:
   the first external data further comprises a plurality of metadata tags, wherein the metadata tags label options in a survey represented in the first external content, and
   the UI component is a survey component having a plurality of survey elements of the first external content, each survey element associated with a respective metadata tag in the plurality of metadata tags.

3. The system of claim 2, wherein broadcasting the second message to respective client software of one or more of the multiple client computing devices comprises:
   determining that one or more engaging users associated with respective client computing devices interacted with the survey component by selecting a survey element, and, in response, broadcasting the second message only to respective client software of client computing devices associated with the one or more engaging users.

4. The system of claim 1, wherein:
the first external data further comprises a plurality of metadata tags, wherein the metadata tags label data representing options in a voting poll represented in the first external content, and
the UI component is a voting component having a plurality of voting elements of the first external content, each voting element associated with a respective metadata tag in the plurality of metadata tags.

5. The system of claim 4, wherein broadcasting the second message to respective client software of one or more of the multiple client computing devices comprises:
determining that one or more engaging users associated with respective client computing devices interacted with the voting component by selecting a voting element, and, in response, broadcasting the second message only to respective client software of client computing devices associated with the one or more engaging users.

6. The system of claim 5, wherein the second message comprises the voting element with the highest number of votes by the one or more engaging users after a predetermined period of time.

7. The system of claim 1, wherein:
the first external data further comprises a plurality of metadata tags, wherein the metadata tags label data representing items for purchase by the external data provider, and
the UI component is a purchasing component having a plurality of purchase elements of the first external content, each purchase element associated with an item available for purchase by the external data provider, and with a respective metadata tag in the plurality of metadata tags.

8. The system of claim 7, wherein broadcasting the second message to respective client software of one or more of the multiple client computing devices comprises:
determining that one or more engaging users associated with respective client computing devices interacted with the purchasing component by selecting a purchase element and purchasing the item associated with the respective purchase element, and, in response, broadcasting the second message only to respective client software of client computing devices associated with the one or more engaging users.

9. The system of claim 1, wherein the operations further comprise:
rebroadcasting the second message to respective client software of the one or more client computing devices of the multiple client computing devices, the rebroadcasted second message containing updated external data from the external data provider.

10. The system of claim 1, wherein broadcasting the second message to respective client software of one or more client computing devices of the multiple client computing devices comprises:
identifying each client computing device in the one or more client computing devices that does not store an associated template defining a respective visual structure for the first in-message application, and in response causing the respective client software on each identified client computing device to download the associated template for the first in-message application from a system template repository.

11. The system of claim 1,
wherein each client computing device in the multiple client computing devices is associated with a particular type of client computing device,
wherein client software for a respective client computing device in the multiple computing devices is operable, when executed by the respective client computing device, to render on the respective client computing device the in-message application, based on the type of client computing device associated with the respective client computing device, and
wherein templates stored on a respective client computing device define respective visual structures for in-message applications that are structured to be rendered on client computing devices of the particular type.

12. A method comprising:
receiving a first message at a system comprising multiple client computing devices each storing one or more application identifiers, templates, and client software, wherein the templates each define respective visual structures for in-message applications, and wherein the client software stored on each client computing device is operable, when executed by the client computing device, to receive a message that contains message content and a reference identifying a location of external data, and to render on the client computing device an in-message application specified by an application identifier in the external data, external content in the external data, the message content, and one or more mappings according to the visual structure defined by a respective template for the in-message application specified by the application identifier, wherein the first message contains first message content and a first reference identifying a location of first external data, wherein the location is a location on an external data provider and the first external data is accessible through the first reference;
obtaining, through the first reference, the first external data, wherein the first external data includes (i) a first application identifier that identifies a first in-message application that has a user interface (UI) component, (ii) first external content, and (iii) one or more first mappings of elements of the first external content to the UI component;
generating a second message that includes the first message content, the first application identifier, the first external content, and the one or more first mappings; and
broadcasting the second message to respective client software of one or more client computing devices of the multiple client computing devices.

13. The method of claim 12, wherein:
the first external data further comprises a plurality of metadata tags, wherein the metadata tags label options in a survey represented in the first external content, and
the UI component is a survey component having a plurality of survey elements of the first external content, each survey element associated with a respective metadata tag in the plurality of metadata tags.

14. The method of claim 13, wherein broadcasting the second message to respective client software of one or more of the multiple client computing devices comprises:
determining that one or more engaging users associated with respective client computing devices interacted with the survey component by selecting a survey element, and, in response, broadcasting the second message only to respective client software of client computing devices associated with the one or more engaging users.

15. The method of claim 12, wherein:
the first external data further comprises a plurality of metadata tags, wherein the metadata tags label data representing options in a voting poll represented in the first external content, and
the UI component is a voting component having a plurality of voting elements of the first external content, each voting element associated with a respective metadata tag in the plurality of metadata tags.

16. The method of claim 15, wherein broadcasting the second message to respective client software of one or more of the multiple client computing devices comprises:
determining that one or more engaging users associated with respective client computing devices interacted with the voting component by selecting a voting element, and, in response, broadcasting the second message only to respective client software of client computing devices associated with the one or more engaging users.

17. The method of claim 16, wherein the second message comprises the voting element with the highest number of votes by the one or more engaging users after a predetermined period of time.

18. The method of claim 12, wherein:
the first external data further comprises a plurality of metadata tags, wherein the metadata tags label data representing items for purchase by the external data provider, and
the UI component is a purchasing component having a plurality of purchase elements of the first external content, each purchase element associated with an item available for purchase by the external data provider, and with a respective metadata tag in the plurality of metadata tags.

19. The method of claim 18, wherein broadcasting the second message to respective client software of one or more of the multiple client computing devices comprises:
determining that one or more engaging users associated with respective client computing devices interacted with the purchasing component by selecting a purchase element and purchasing the item associated with the respective purchase element, and, in response, broadcasting the second message only to respective client software of client computing devices associated with the one or more engaging users.

20. The method of claim 12, further comprising:
rebroadcasting the second message to respective client software of the one or more client computing devices of the multiple client computing devices, the rebroadcasted second message containing updated external data from the external data provider.

21. The method of claim 12, wherein broadcasting the second message to respective client software of one or more client computing devices of the multiple client computing devices comprises:
identifying each client computing device in the one or more client computing devices that does not store an associated template defining a respective visual structure for the first in-message application, and in response causing the respective client software on each identified client computing device to download the associated template for the first in-message application from a system template repository.

22. The method of claim 12,
wherein each client computing device in the multiple client computing devices is associated with a particular type of client computing device,
wherein client software for a respective client computing device in the multiple computing devices is operable, when executed by the respective client computing device, to render on the respective client computing device the in-message application, based on the type of client computing device associated with the respective client computing device, and
wherein templates stored on a respective client computing device define respective visual structures for in-message applications that are structured to be rendered on client computing devices of the particular type.

23. One or more non-transitory computer-readable storage media encoded with instructions that are operable, when executed by one or more server computers on a system, to cause the one or more server computers that implements a real-time messaging platform to perform operations comprising:
receiving a first message at a system comprising multiple client computing devices each storing one or more application identifiers, templates, and client software, wherein the templates each define respective visual structures for in-message applications, and wherein the client software stored on each client computing device is operable, when executed by the client computing device, to receive a message that contains message content and a reference identifying a location of external data, and to render on the client computing device an in-message application specified by an application identifier in the external data, external content in the external data, the message content, and one or more mappings according to the visual structure defined by a respective template for the in-message application specified by the application identifier, wherein the first message contains first message content and a first reference identifying a location of first external data, wherein the location is a location on an external data provider and the first external data is accessible through the first reference;
obtaining, through the first reference, the first external data, wherein the first external data includes (i) a first application identifier that identifies a first in-message application that has a user interface (UI) component, (ii) first external content, and (iii) one or more first mappings of elements of the first external content to the UI component;
generating a second message that includes the first message content, the first application identifier, the first external content, and the one or more first mappings; and
broadcasting the second message to respective client software of one or more client computing devices of the multiple client computing devices.

24. The one or more non-transitory computer-readable storage media of claim 23, wherein:
the first external data further comprises a plurality of metadata tags, wherein the metadata tags label options in a survey represented in the first external content, and
the UI component is a survey component having a plurality of survey elements of the first external content, each survey element associated with a respective metadata tag in the plurality of metadata tags.

25. The one or more non-transitory computer-readable storage media of claim 24, wherein broadcasting the second message to respective client software of one or more of the multiple client computing devices comprises:

determining that one or more engaging users associated with respective client computing devices interacted with the survey component by selecting a survey element, and, in response, broadcasting the second message only to respective client software of client computing devices associated with the one or more engaging users.

26. The one or more non-transitory computer-readable storage media of claim 23, wherein:

the first external data further comprises a plurality of metadata tags, wherein the metadata tags label data representing options in a voting poll represented in the first external content, and the UI component is a voting component having a plurality of voting elements of the first external content, each voting element associated with a respective metadata tag in the plurality of metadata tags.

27. The one or more non-transitory computer-readable storage media of claim 26, wherein broadcasting the second message to respective client software of one or more of the multiple client computing devices comprises:

determining that one or more engaging users associated with respective client computing devices interacted with the voting component by selecting a voting element, and, in response, broadcasting the second message only to respective client software of client computing devices associated with the one or more engaging users.

28. The one or more non-transitory computer-readable storage media of claim 27, wherein the second message comprises the voting element with the highest number of votes by the one or more engaging users after a predetermined period of time.

29. The one or more non-transitory computer-readable storage media of claim 23, wherein:

the first external data further comprises a plurality of metadata tags, wherein the metadata tags label data representing items for purchase by the external data provider, and the UI component is a purchasing component having a plurality of purchase elements of the first external content, each purchase element associated with an item available for purchase by the external data provider, and with a respective metadata tag in the plurality of metadata tags.

30. The one or more non-transitory computer-readable storage media of claim 29, wherein broadcasting the second message to respective client software of one or more of the multiple client computing devices comprises:

determining that one or more engaging users associated with respective client computing devices interacted with the purchasing component by selecting a purchase element and purchasing the item associated with the respective purchase element, and, in response, broadcasting the second message only to respective client software of client computing devices associated with the one or more engaging users.

31. The one or more non-transitory computer-readable storage media of claim 23, wherein the operations further comprise:

rebroadcasting the second message to respective client software of the one or more client computing devices of the multiple client computing devices, the rebroadcasted second message containing updated external data from the external data provider.

32. The one or more non-transitory computer-readable storage media of claim 23, wherein broadcasting the second message to respective client software of one or more client computing devices of the multiple client computing devices comprises:

identifying each client computing device in the one or more client computing devices that does not store an associated template defining a respective visual structure for the first in-message application, and in response causing the respective client software on each identified client computing device to download the associated template for the first in-message application from a system template repository.

33. The one or more non-transitory computer-readable storage media of claim 23, wherein each client computing device in the multiple client computing devices is associated with a particular type of client computing device, wherein client software for a respective client computing device in the multiple computing devices is operable, when executed by the respective client computing device, to render on the respective client computing device the in-message application, based on the type of client computing device associated with the respective client computing device, and wherein templates stored on a respective client computing device define respective visual structures for in-message applications that are structured to be rendered on client computing devices of the particular type.

\* \* \* \* \*